(12) United States Patent
Bhowmick et al.

(10) Patent No.: US 12,066,738 B2
(45) Date of Patent: Aug. 20, 2024

(54) GRADIENT-INDEX LIQUID CRYSTAL LENS HAVING LENS SEGMENTS WITH OPTICAL POWER GRADIENT

(71) Applicant: Meta Platforms Technologies, LLC, Menlo Park, CA (US)

(72) Inventors: Amit Bhowmick, Kent, OH (US); Afsoon Jamali, Issaquah, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/460,339

(22) Filed: Sep. 1, 2023

(65) Prior Publication Data

US 2024/0085756 A1 Mar. 14, 2024

Related U.S. Application Data

(60) Provisional application No. 63/403,295, filed on Sep. 1, 2022.

(51) Int. Cl.
*G02F 1/29* (2006.01)

(52) U.S. Cl.
CPC ..................... *G02F 1/29* (2013.01)

(58) Field of Classification Search
None
See application file for complete search history.

(56) References Cited

U.S. PATENT DOCUMENTS

| | | | | |
|---|---|---|---|---|
| 4,242,913 A * | 1/1981 | Mezrich | ................. | G10K 11/34 367/105 |
| 4,629,927 A * | 12/1986 | Samodovitz | .......... | B06B 1/0644 310/317 |
| 10,106,397 B1 * | 10/2018 | Kim | .................... | B01L 3/50273 |
| 10,613,394 B2 * | 4/2020 | Gao | .................. | G02F 1/133528 |
| 11,442,332 B1 * | 9/2022 | Sprague | ................ | G02C 7/083 |
| 2001/0040743 A1 * | 11/2001 | Graves | ...................... | G02F 1/29 359/849 |
| 2007/0183293 A1 * | 8/2007 | Murata | ............... | G11B 7/13925 369/112.02 |
| 2016/0178811 A1 * | 6/2016 | Choi | ........................ | G02B 3/14 349/200 |
| 2017/0293197 A1 * | 10/2017 | Van Heugten | ............ | G02F 1/29 |
| 2017/0336637 A1 * | 11/2017 | Van Heugten | ..... | G02B 27/0172 |
| 2018/0052377 A1 * | 2/2018 | Gordon | ............... | G02F 1/13439 |
| 2018/0246354 A1 * | 8/2018 | Popovich | .............. | G02F 1/1334 |
| 2019/0346718 A1 * | 11/2019 | Liu | .................... | G02F 1/133526 |
| 2020/0033524 A1 * | 1/2020 | Gao | .................. | G02F 1/133528 |
| 2020/0166820 A1 * | 5/2020 | Wurmfeld | ................ | G02B 3/14 |
| 2020/0301239 A1 * | 9/2020 | Akkaya | .............. | G02B 27/0172 |
| 2021/0116776 A1 * | 4/2021 | Jiang | ......................... | G02F 1/29 |

(Continued)

*Primary Examiner* — Ryan Crockett
(74) *Attorney, Agent, or Firm* — Greenberg Traurig, LLP

(57) ABSTRACT

A lens system may include a lens having a first electrode electrode layer, a second electrode layer, and a liquid crystal layer disposed between the first electrode layer and the second electrode layer. The lens may be divided into a plurality of lens segments that are concentrically arranged proceeding from a center to a radially outer periphery of the lens. An optical power of a first lens segment of the plurality of lens segments may be greater than an optical power of a second lens segment of the plurality of lens segments disposed radially outward relative to the first lens segment. Various other devices, systems, and methods are also disclosed.

20 Claims, 17 Drawing Sheets

(56) References Cited

U.S. PATENT DOCUMENTS

| | | | |
|---|---|---|---|
| 2021/0231978 A1* | 7/2021 | Wang | G02B 3/08 |
| 2021/0349359 A1* | 11/2021 | Zhao | G02F 1/13439 |
| 2021/0389641 A1* | 12/2021 | Heugten | G02F 1/29 |
| 2022/0066262 A1* | 3/2022 | Danilova | G02F 1/133526 |
| 2023/0176446 A1* | 6/2023 | Shibuya | G02F 1/294 |
| | | | 349/200 |
| 2023/0351931 A1* | 11/2023 | Sears | G02B 27/4205 |
| 2024/0004107 A1* | 1/2024 | Jamali | G02B 27/0172 |
| 2024/0094594 A1* | 3/2024 | Stratton | G02F 1/294 |

* cited by examiner ns.
GRADIENT-INDEX LIQUID CRYSTAL LENS HAVING LENS SEGMENTS WITH OPTICAL POWER GRADIENT This application claims the benefit of U.S. Provisional Application No. 63/403,295, filed Sep. 1, 2022, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1A:
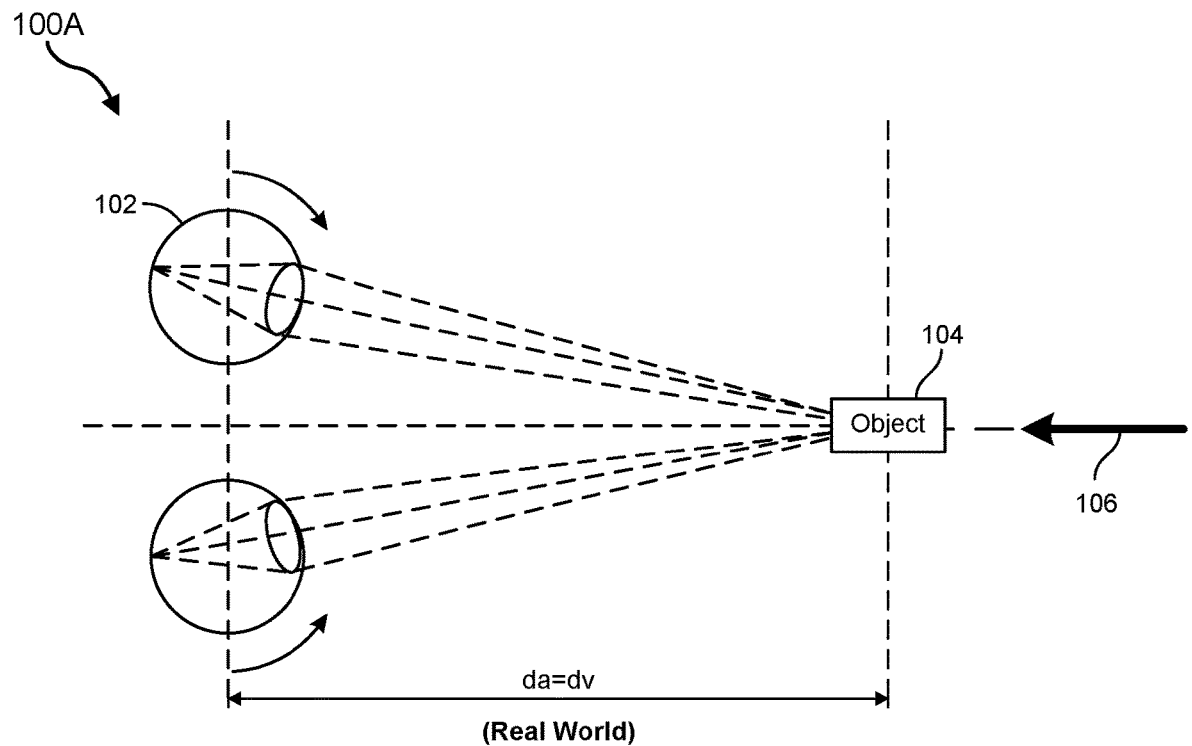
FIG. 1A illustrates a relationship between vergence and eye focal length in the real world according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Display devices may include gradient-index liquid crystal (GRIN LC) lenses that utilize variations in liquid crystal alignment to refract light in a manner similar to conventional lenses. Large aperture (i.e., greater than 10 mm) GRIN LC lens that do not include segmented phase profiles may take an unacceptably long time to switch lens focus (e.g., more than a full day to switch). Without compromising optical power, the switching speed of a GRIN LC lens may be increased using a segmented phase profile design that functions in a manner similar to a conventional Fresnel lens. With N number of segmented resets, switching time may, for example, be increased by $N^2$ times. With 28 Fresnel resets, 0 D to 2.5 D LC lens may have a switching time of less than 750 ms.

However, introduction of Fresnel resets in a GRIN LC lens may cause optical quality degradation due to certain factors. For example, scattering of light from the boundaries of phase resets may cause noticeable image aberrations. As the number of phase resets increase, the amount of scattered light also increases. Haze induced from this scattered light may cause the modulation transfer function (MTF) of the lens to drop. Additionally, light diffractions from the reset boundaries may be visible to the human eye due to phase mismatch. As the number of Fresnel resets increase, the width of the resets typically become correspondingly narrower. As a result, the angle of diffraction may increase, causing multiple order diffraction issues. While perfect phase match conditions can solve the diffraction problem, perfect phase matching is often very difficult to achieve due to factors such as dispersion, refractive index variation due to temperature, cell thickness variation, driving voltage drop, fabrication error, etc.

The present disclosure is generally directed to GRIN LC lenses that include a reduced number of phase resets, with phase resets exhibiting gradually reduced optical power in comparison to a related ideal lens phase profile. The reduction in the number of phase resets may result in reduced scattering and angles of diffraction, thereby providing improved optical quality. In some examples, optical power of a GRIN LC lens may be dependent on the number of phase resets, the birefringence of the liquid crystal (LC) material, and the LC cell thickness. Assuming the LC material and cell thickness are unchanged, reducing the number of phase resets may reduce the total optical power. Taking into account human visual acuity with gazing angle, if the optical power of a GRIN LC lens is gradually decreased, in a stepwise manner, from the center towards the outer edge of the lens, the required number of phase resets will go down. The human eye may be able to accommodate reduced optical power of a lens towards the edge of the lens. At any tunable optical power state, gradual change of optical power of a GRIN LC lens may result in better MTF than a GRIN LC lens that has more phase resets that maintain a fixed optical power throughout a clear aperture. Gradual change of the optical power of a GRIN LC lens may also help reduce dynamic distortion.

Artificial reality devices, such as virtual reality headsets, may be used to simulate virtual environments. For example, stereoscopic images can be displayed on an electronic display inside a headset to simulate the illusion of depth, and head tracking sensors can be used to estimate what portion of the virtual environment is being viewed by the user. However, because existing headsets are often unable to correctly render or otherwise compensate for vergence and accommodation conflicts, such simulation may cause visual fatigue and discomfort for the users. Augmented reality and mixed reality headsets may display a virtual image overlapping with real-world images. To create a comfortable viewing experience, virtual images generated by such headsets are typically displayed at distances suitable for eye accommodations of real-world images in real time during the viewing process.

Vergence-accommodation conflict is a common issue in conventional artificial reality systems, including virtual, augmented, and mixed reality systems. "Accommodation" is a process of adjusting the focal length of an eye lens. During accommodation, the optics of an eye are adjusted to keep an object in focus on the retina as its distance from the eye varies. "Vergence" is the simultaneous movement or rotation of both eyes in opposite directions to obtain or maintain binocular vision and is connected to accommodation of the eye. Under normal conditions, when human eyes look at a new object at a distance different from an object they had been looking at, the eyes automatically change focus (by changing their shape) to provide accommodation at the new vergence distance of the new object.

A GRIN LC lens, as disclosed herein, may include an electrode array that provides variations in voltages applied to a liquid crystal layer of the lens, with the variations producing a voltage gradient proceeding from a center of the lens outward. Voltages applied to the liquid crystal layer may be selectively changed so as to generate different lens powers corresponding to active display conditions and/or user eye orientation. Accordingly, GRIN LC lenses, as disclosed herein, may address the vergence-accommodation conflict by compelling a user's eyes to focus at a focal distance coinciding with a vergence location of a virtual object displayed by the display device. Moreover, since the lens diopter is not determined solely by a surface shape of the GRIN LC lens, the thickness of the disclosed GRIN LC lenses may be significantly reduced in comparison to conventional lenses.

In some examples, an aperture of the GRIN LC lens may be partitioned into multiple zones covering different portions of the lens. The zones may be electrically separated from each other so that they can be selectively activated by a controller. For example, one or more zones aligned with a user's gaze direction may be activated while other zones are deactivated or maintained in a previous state. The display device may include an eye-tracking system to detect a gaze direction for each of a user's eyes. By activating selected positional zones of the lens, rather than activating the entire lens area all at one, a response time of a foveal region of the lens may be substantially reduced. Accordingly, changes in the lens shape may be less noticeable to a user during transitions in lens focus. Additionally, the discretely partitioned zones may enable manufacturing of GRIN LC lenses having increased diameters.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-20, a detailed description of GRIN LC lenses and systems. The discussion associated with FIGS. 1-18 relates to the architecture, operation, and manufacturing of various example GRIN LC lenses and systems. The discussion associated with FIGS. 19 and 20 relates to exemplary virtual reality and augmented reality devices that may include GRIN LC lenses as disclosed herein.

FIG. 1A shows a diagram 100A illustrating an example of how the human eye experiences vergence and accommodation in the real world. As shown in FIG. 1A, a user is looking at a real object 104 such that the user's eyes 102 are verged on real object 104 and gaze lines from the user's eyes 102 intersect at real object 104. As real object 104 is moved closer to the user's eyes 102 (as indicated by arrow 106), each eye 102 rotates inward (i.e., convergence) to stay verged on real object 104. As real object 104 gets closer, the user's eyes 102 accommodate for the closer distance by changing their shape to reduce the power or focal length. The distance at which the eyes 102 must be focused to create a sharp retinal image is the accommodation distance. Thus, under normal conditions in the real world, the vergence distance (dv) is equal to the accommodation distance (da).

Figure 1B:
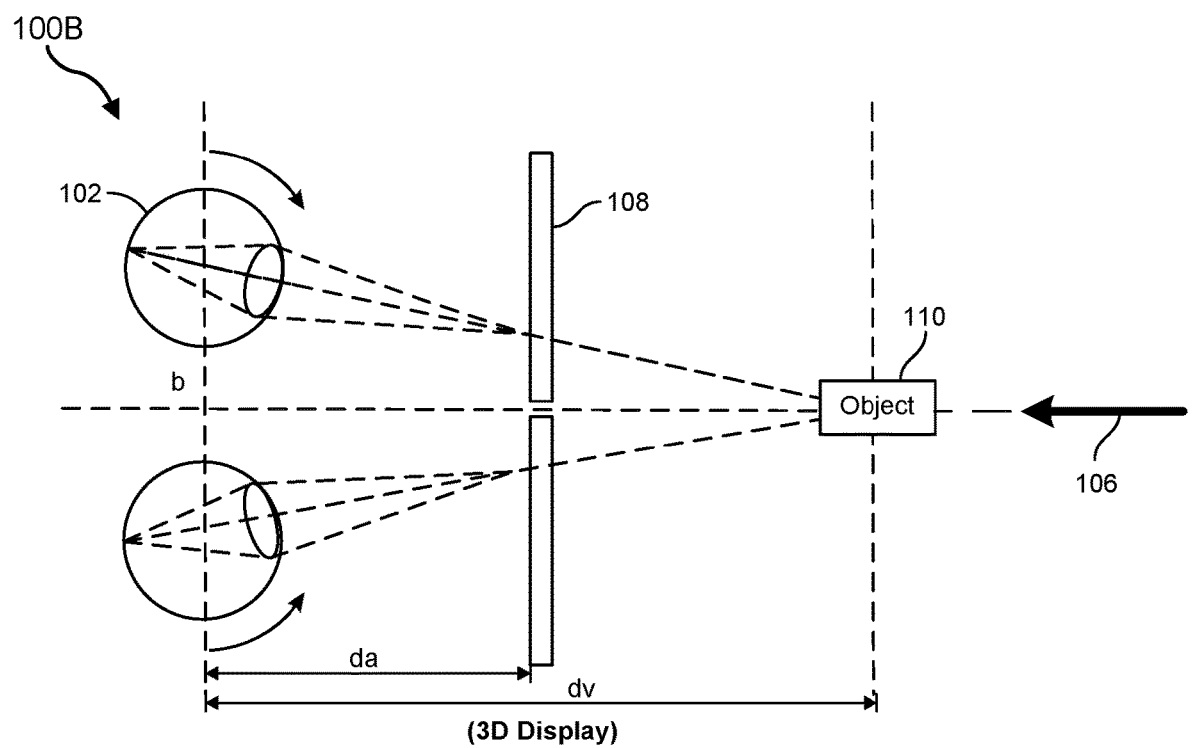
FIG. 1B illustrates a conflict between vergence and eye focal length in a three-dimensional (3D) display screen according to some embodiments.

FIG. 1B shows a diagram 100B illustrating an example conflict between vergence and accommodation that can occur with conventional three-dimensional displays. As shown in FIG. 1B, a user is looking at a virtual object 110 displayed on an electronic screen(s) 108. The user's eyes 102 are verged on virtual object 110 (gaze lines from the user's eyes 102 are shown intersecting at virtual object 110). However, virtual object 110 is located at a greater distance from the user's eyes 102 than electronic screen(s) 108. As virtual object 110 is rendered on the electronic screen(s) 108 to appear closer to the user, each eye 102 again rotates inward to stay verged on virtual object 110, but the power or focal length of each eye 102 is not reduced. Hence, the user's eyes may not accommodate in the manner illustrated in FIG. 1A. Accordingly, instead of reducing power or focal length to accommodate for the closer vergence distance associated with virtual object 110, each eye 102 maintains accommodation at a distance associated with the electronic screen 108. Thus, the vergence distance dv may not be equal to the accommodation distance da for the human eye for objects displayed on 2-dimensional electronic screens. This discrepancy between vergence distance dv and accommodation distance da is commonly referred to as "vergence-accommodation conflict." A user experiencing only vergence or accommodation, but not both simultaneously, with respect to a virtual object may undesirably experience eye fatigue and discomfort during use.

"Optical series," as used herein, may refer to relative positioning of a plurality of optical elements such that light, for each optical element of the plurality of optical elements, is transmitted by that optical element before being transmitted by another optical element of the plurality of optical elements. For embodiments described herein, optical elements may be aligned in various arrangements without regard to a specific ordering within an optical series. For example, optical element A placed before optical element B, or optical element B placed before optical element A, may both be in optical series with each other. An optical series may represent a combination of optical elements having individual optical properties that are compounded with each other when placed in series.

As used herein, a material or element that is "transparent" or "optically transparent" may, for a given thickness, have a transmissivity within the visible light spectrum of at least approximately 70%, e.g., approximately 70, 80, 90, 95, 97, 98, 99, or 99.5%, including ranges between any of the foregoing values, and less than approximately 10% bulk haze, e.g., approximately 0.5, 1, 2, 4, 6, or 8% bulk haze, including ranges between any of the foregoing values. In accordance with some embodiments, a "fully transparent" material or element may have (a) a transmissivity (i.e., optical transmittance) within the visible light spectrum of at least approximately 90%, e.g., approximately 90, 95, 97, 98, 99, or 99.5%, including ranges between any of the foregoing values, (b) less than approximately 10% bulk haze, e.g., approximately 0.5, 1, 2, 4, 6, or 8% bulk haze, including ranges between any of the foregoing values, (c) less than approximately 30% reflectivity, e.g., approximately 1, 2, 5, 10, 15, 20, or 25% reflectivity, including ranges between any of the foregoing values, and (d) at least 70% optical clarity, e.g., approximately 70, 80, 90, 95, 97, 98, 99, or 99.5% optical clarity, including ranges between any of the foregoing values. Transparent and fully transparent materials will typically exhibit very low optical absorption and minimal optical scattering. In some embodiments, "transparency" may refer to internal transparency, i.e., exclusive of Fresnel reflections.

As used herein, the terms "haze" and "clarity" may refer to an optical phenomenon associated with the transmission of light through a material, and may be attributed, for example, to the refraction of light within the material, e.g., due to secondary phases or porosity and/or the reflection of light from one or more surfaces of the material. As will be appreciated by those skilled in the art, haze may be associated with an amount of light that is subject to wide angle scattering (i.e., at an angle greater than 2.5° from normal) and a corresponding loss of transmissive contrast, whereas clarity may relate to an amount of light that is subject to narrow angle scattering (i.e., at an angle less than 2.5° from normal) and an attendant loss of optical sharpness or "see through quality."

A material or element that is "reflective" or "optically reflective" may, for example, have a transmissivity within the visible light spectrum of less than approximately 2%, e.g., less than 2, 1, 0.5, 0.2, or 0.1%, including ranges between any of the foregoing values.

As used herein, the term "approximately" in reference to a particular numeric value or range of values may, in certain embodiments, mean and include the stated value as well as all values within 10% of the stated value. Thus, by way of example, reference to the numeric value "50" as "approximately 50" may, in certain embodiments, include values equal to 50±5, i.e., values within the range 45 to 55.

Figure 2A:
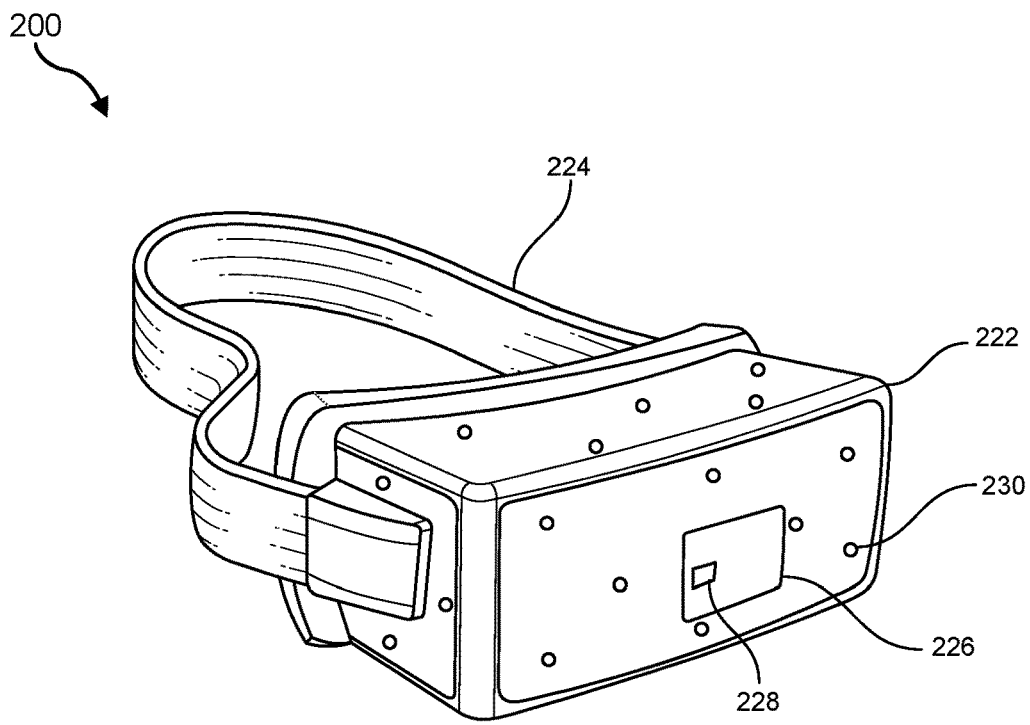
FIG. 2A is a perspective view of an example head-mounted display according to some embodiments.

FIG. 2A shows an example head-mounted display (HMD) 200 in accordance with some embodiments. As shown in FIG. 2A, the HMD 200 may include a front rigid body 222 and a band 224. The front rigid body 222 may include one or more electronic display elements of an electronic display, an inertial measurement unit (IMU) 226, one or more position sensors 228, and locators 230. In the example shown in FIG. 2A, position sensors 228 may be located within IMU 226, and neither IMU 226 nor position sensors 228 may be visible to a user on the device exterior. HMD 200 may, for example, function as a virtual reality device, an augmented reality device, and/or a mixed reality device. In some examples, when HMD 200 acts as an augmented or mixed reality device, portions of HMD 200 and its internal components may be at least partially transparent.

Figure 2B:
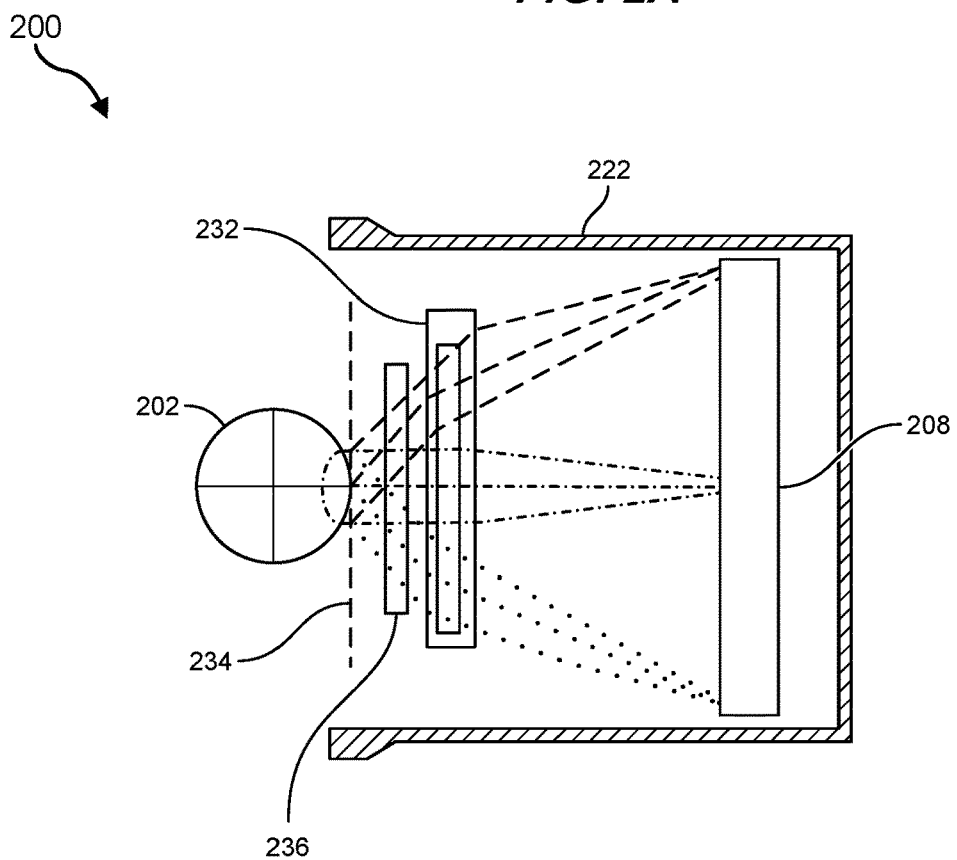
FIG. 2B is a cross-sectional view of a front rigid body of the head-mounted display shown in FIG. 2A according to some embodiments.

FIG. 2B is a cross-sectional view of front rigid body 222 of the embodiment of HMD 200 shown in FIG. 2A. As shown in FIG. 2B, front rigid body 222 may include an electronic display 208, a varifocal block 232, and, in some examples, an eye-tracking system 236. Electronic display 208 may display images (i.e., virtual scenes) to a user wearing HMD 200. In some embodiments, electronic display 208 may include a stack of one or more waveguide displays including, but not limited to, a stacked waveguide display. Varifocal block 232 may include one or more varifocal structures in optical series. A varifocal structure is an optical device that is configured to dynamically adjust its focus in accordance with instructions from a varifocal system. Electronic display 208 and varifocal block 232 together provide image light to an exit pupil 234. Eye-tracking system 236 may include, e.g., one or more sources that illuminate one or both eyes of the user and one or more cameras that capture images of one or both eyes of the user. Eye-tracking system 236 may detect a location of an object in the virtual scene at which the user's eye 202 is currently looking. Exit pupil 234 may be the location of front rigid body 222 where a user's eye 202 is positioned. For purposes of illustration, FIG. 2B shows a cross section of front rigid body 222 associated with a single eye 202, but another portion of varifocal block 232 or another varifocal block, which is separated from varifocal block 232, may provide altered image light to another eye of the user.

Figure 3:
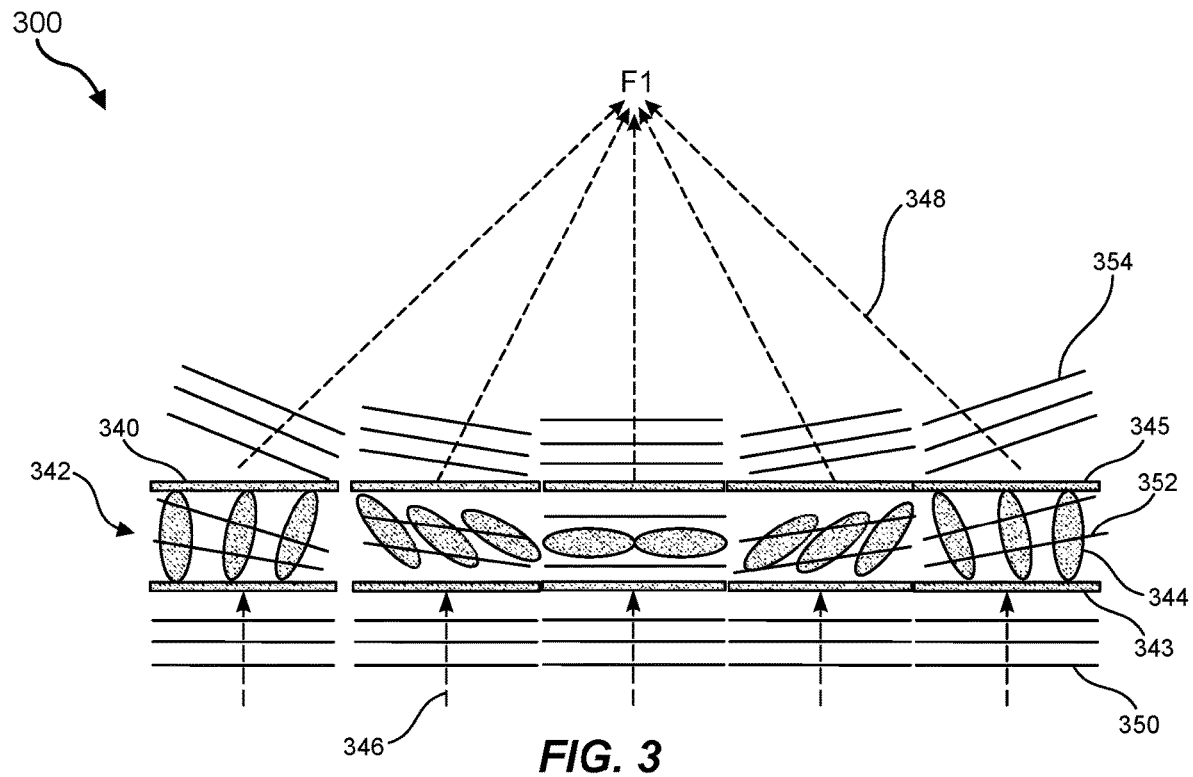
FIG. 3 is a diagram illustrating light refracted through an example gradient-index liquid crystal (GRIN LC) lens according to some embodiments.

FIG. 3 shows a diagram 300 of light refracted through an example GRIN LC lens 340 according to some embodiments. Liquid crystal orientations may be varied as desired between liquid crystal molecules located at central and peripheral positions within GRIN LC lens 340. For example, liquid crystal molecules may be selectively oriented so as to redirect incident light to provide a desired degree of optical power. GRIN LC lens 340 in FIG. 3 includes a liquid crystal layer 342 that includes a solution of liquid crystals molecules 344. As shown, liquid crystals molecules 344 may be selectively varied in orientation proceeding from a central region to a laterally peripheral region of liquid crystal layer 342. For example, liquid crystal molecules 344 at a central region of liquid crystal layer 342 may be oriented substantially horizontal to surfaces abutting liquid crystal layer 342 (see, e.g., alignment layers 466A and 466B shown in FIG. 4). Proceeding peripherally outward from the center, liquid crystal molecules 344 may progressively change in pitch, with liquid crystal molecules 344 assuming an increasingly angular slope.

The orientations of liquid crystal molecules 344 in each region of liquid crystal layer 342 may be oriented by, for example, progressively changing a voltage applied to liquid crystal layer 342 at the respective regions. For example, a voltage applied to the peripheral region of liquid crystal layer 342 may be higher or lower than a voltage applied to the central region of liquid crystal layer 342, with voltages between the central and peripheral regions progressively increasing or decreasing proceeding from the central region to the peripheral region. While rod-shaped liquid crystal molecules are illustrated in the example shown in FIG. 3, any suitable liquid crystal molecules having any suitable shape may be included in liquid crystal layer 342. For example, liquid crystal layer 342 may additionally or alternatively include disc-like (i.e., discotic), bowlic (i.e., conic), bent-core, and/or any other suitable type of liquid crystal molecules.

FIG. 3 illustrates the manner in which variations in liquid crystal orientation may alter paths of light beams passing through liquid crystal layer 342. In the example shown, incident light beams may be refracted through various regions of liquid crystal layer 342 so that they are focused at a common focal point F1. In some embodiments, liquid crystal molecules 344 in liquid crystal layer 342 may be oriented to instead refract light outward to provide divergent lensing. In the example illustrated in FIG. 3, incident light 346 may approach an incident side surface 343 of GRIN LC lens 340 along an incident wavefront 350 such that incident light 346 enters GRIN LC lens 340 at an angle that is approximately normal to incident side surface 343. As described in greater detail below with reference to FIG. 4, external side surfaces of liquid crystal layer 342 may include transparent surfaces, such as a glass surfaces, which may be uncoated or coated (e.g., with an antireflective film).

Figure 4:
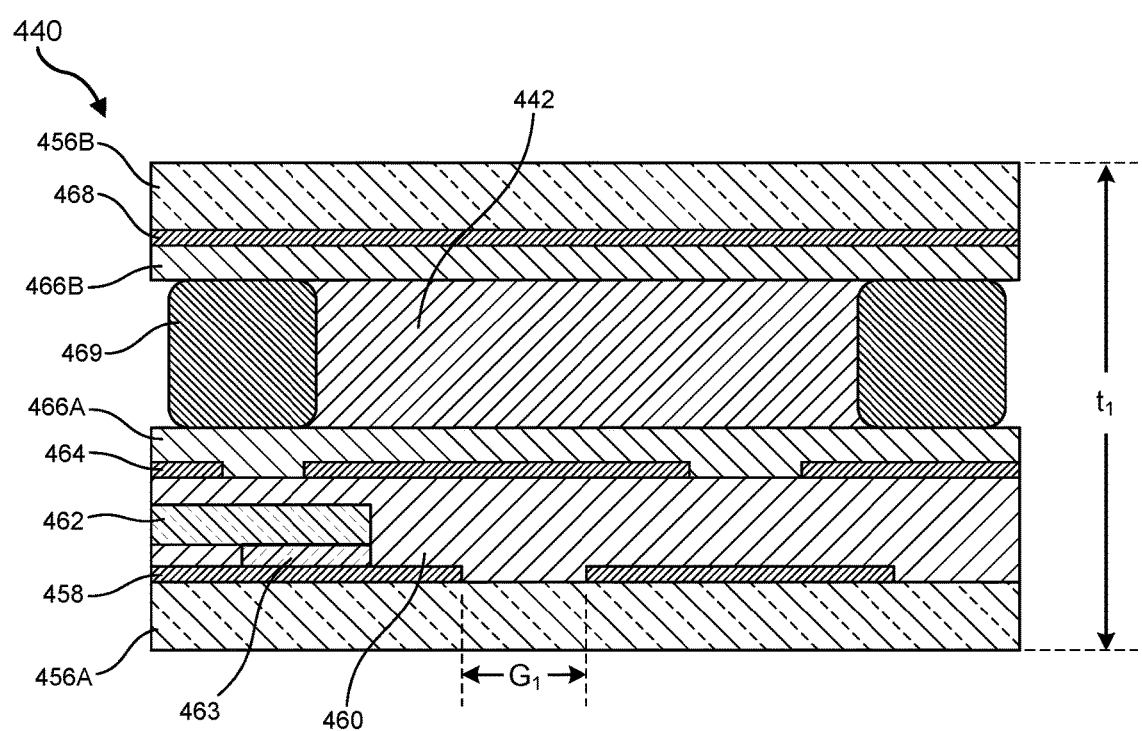
FIG. 4 is a cross-sectional diagram illustrating the structure of an example GRIN LC lens according to some embodiments.

The incident light may pass through liquid crystal layer 342, where the light is refracted by liquid crystal molecules 344. Liquid crystal molecules 344 in different regions of liquid crystal layer 342 may be oriented at varied angles so as to refract light at correspondingly different angles within each region. For example, as shown in FIG. 3, liquid crystal molecules 344 may vary in degree of inclination with respect to abutting surfaces (e.g., alignment surfaces as shown in FIG. 4) along a gradient proceeding from the central region towards the outer periphery of liquid crystal layer 342. Liquid crystal molecules 344 having higher degrees of inclination may refract incoming light to a greater extent than those with lower degrees of inclination, as represented by liquid crystal wavefronts 352, which have different orientations corresponding to different inclinations of liquid crystal molecules 344 at various locations. The liquid crystal molecules 344 may thus be oriented at pitches that direct light in different regions towards a common focal point. Beams of exiting light 348 emitted from an exit side surface 345 of GRIN LC lens 340 are shown in FIG. 3. The exiting light 348 at different regions may be directed along corresponding exiting wavefronts 354, which converge at an exemplary focal point F1.

In some examples, different voltage profiles may be applied to liquid crystal layer 342 to change optical characteristics of GRIN LC lens 340 as needed. For example, voltages may be selectively applied by an electrode array of GRIN LC lens 340 to reorient liquid crystal molecules 344 so as to change a focal point and optical power of the lens. In at least one embodiment, liquid crystal molecules 344 may also be selectively oriented to produce a negative diopter in GRIN LC lens 340 that spreads incoming light outward in a manner similar to a concave lens. In this example, the negative power may be accomplished by orienting liquid crystal molecules 344 within various regions of liquid crystal layer 342 to refract light outward to an increasingly greater extent proceeding from a central region outward toward the periphery.

FIG. 4 is a cross-sectional diagram illustrating the structure of an example GRIN LC lens 440 according to some embodiments. Dimensions of GRIN LC lens 440 and/or parts thereof illustrated in this figure are not necessarily to scale. As shown, GRIN LC lens 440 may include a pair of lens substrates 456A and 456B defining opposing outer surfaces of GRIN LC lens 440. Lens substrates 456A and/or 456B may be formed of one or more rigid, transparent materials, such as glass, sapphire, polymer, and/or silicon-based (e.g., $SiO_2$) materials. Lens substrates 456A and 456B may be substantially transparent in the visible wavelength band (i.e., approximately 380 nm to approximately 750 nm). In certain embodiments, the lens substrate 456A and/or 456B may also be transparent in some or all of the infrared (IR) band (i.e., approximately 750 nm to approximately 1 mm). Surfaces of lens substrates 456A and 456B may be uncoated or coated (e.g., with an antireflective film, polarization film, etc.). GRIN LC lens 440 may have a lens thickness $t_1$ measured from lens substrate 456A to lens substrate 456B.

As shown in FIG. 4, driving electrodes 458 may be disposed on a first lens substrate 456A. Adjacent driving electrodes 458 may be separated from each other by intervening gaps $G_1$, as illustrated. Gaps $G_1$ may each have any suitable width between driving electrodes 458, such as a width of from approximately 0.5 µm to approximately 4 µm (e.g., approximately 0.5, 1.0, 1.5, 2.0, 2.5, 3.0, 3.5, or 4.0 µm). As described in additional detail below, adjacent driving electrodes 458 be electrically coupled to each other by a linking resistor within a shared driving zone (see, e.g., FIGS. 6 and 7). Driving electrodes 458 may be arranged in an electrode array that that overlaps a liquid crystal layer 442 of GRIN LC lens 440.

A bus line 462 may be electrically coupled to at least one of driving electrodes 458 to provide selected voltages to driving electrodes 458. For example, bus line 462 may be electrically coupled to the illustrated driving electrode 458 by a via interconnect 463 extending directly between bus line 462 and the driving electrode 458. Voltages at other driving electrodes 458 may be different than the voltage applied by bus line 462 due to, for example, reductions in voltages across the inter-electrode resistors connecting other driving electrodes 458 to the driving electrode 458 coupled to the bus line 462. Voltages applied to each of driving electrodes 458 may be controllably varied to produce desired lensing of light passing through liquid crystal layer 442. In various examples, GRIN LC lens 440 may include multiple bus lines that are each electrically coupled to different electrodes to enable production of separate driving zones and/or Fresnel reset regions, as discussed in more detail below. Additionally, multiple bus lines within a particular driving zone and/or Fresnel reset may be used to apply different voltages to separate driving electrodes 458 so as to provide a voltage gradient between the driving electrodes 458.

According to at least one embodiment, an insulating layer 460 may be disposed over driving electrodes 458 and bus line 462. Insulating layer 460 may also surround portions of bus line 462 not directly coupled to a driving electrode 458 such that portions of insulating layer 460 are disposed between bus line 462 and other driving electrodes 458. In some examples, portions of insulating layer 460 may also be disposed in gaps $G_1$ defined between adjacent driving electrodes 458. Insulating layer 460 may include one or more dielectric layers, which may include a stoichiometric or non-stoichiometric oxide, fluoride, oxyfluoride, nitride, oxynitride, sulfide, $SiO_2$, $TiO_2$, $Al_2O_3$, $Y_2O_3$, $HfO_2$, $ZrO_2$, $Ta_2O_5$, $Cr_2O_3$, $AlF_3$, MgFS2, $NdF_3$, $LaF_3$, $YF_3$, $CeF_3$, $YbF_3$, $Si_3N_4$, ZnS, and/or ZnSe.

A plurality of floating electrodes 464 may be disposed on insulating layer 450 so that insulating layer 450 is disposed between floating electrodes 464 and driving electrodes 458/ bus line 462. As shown in FIG. 4, floating electrodes 464 may be arrayed so as to overlap gaps $G_1$ between driving electrodes 458. Floating electrodes 464 may be capacitively coupled to the driving electrodes 458 rather than driven by ohmic connection to driving electrodes 458. In some examples, floating electrodes 464 may be configured to cover a portion of the area of each of neighboring driving electrode 458 (e.g., up to approximately half of each neighboring driving electrode 458). In some examples floating electrodes 464 may be configured to overlap a substantial portion (e.g., approximately half or less) of the area of each neighboring driving electrode 458. Floating electrodes 464 may address image degradation in GRIN LC lens 440 by reducing light scattering due to gaps G1 defined between adjacent driving electrodes 458.

A first alignment layer 466A may be formed over floating electrodes 464 and portions of insulating layer 450 exposed in gap regions between adjacent floating electrodes 464. First alignment layer 466A may contact liquid crystal layer 442 and may enable proper orientation of liquid crystal molecules within liquid crystal layer 442. First alignment layer 466A may include any material and surface texture suitable for aligning liquid crystal molecules in a desired manner. For example, first alignment layer 442 may be formed of a polyimide (PI) material that is rubbed on the surface facing liquid crystal layer 442. In at least one example, first alignment layer 466A may be formed of a PI layer having a surface that is modified by irradiation with ultraviolet (UV) light to promote curing or partial curing of the PI material. Following UV irradiation, the surface of first alignment layer 466A may be mechanically rubbed in selected directions (e.g., horizontally, circularly, etc.) to provide a substantially consistent surface structure producing predictable surface alignment of liquid crystal molecules in liquid crystal layer 442. Any other suitable material or combination of materials may be included in first alignment layer 466A, including, for example, polymers (e.g., perfluoropolyether films), metal-oxides, and/or carbon nanotubes.

GRIN LC lens 440 may also include a second alignment layer 466B facing first alignment layer 466A. In some embodiments, second alignment layer 466B may be formed in the same or similar manner as first alignment layer 466A and may include the same or similar materials (e.g., PI). Additionally or alternatively, second alignment layer 466B may include any other suitable materials formed using any suitable technique providing a surface configured to adequately align liquid crystal molecules within liquid crystal layer 442 in combination with first alignment layer 466A.

Liquid crystal layer 442 may be disposed between first and second alignment layers 466A and 466B, as illustrated in FIG. 4. Additionally, a gasket 469 may be disposed between first and second alignment layers 466A and 466B and may at least partially surround an outer periphery of liquid crystal layer 442. In some examples, gasket 469 may include spacers to maintain a selected space (i.e., LC cell space) between first and second alignment layers 466A and 466B such that liquid crystal layer 442 has a cell thickness suitable for proper operation, as described herein. Additional spacers may be included as needed between first and second alignment layers 466A and 466B to maintain a consistent space between the layers. Gasket 469 may provide an edge seal around liquid crystal layer 442 and may include any suitable adhesive and/or sealing agent to prevent leakage at the periphery.

In various embodiments, GRIN LC lens 440 may additionally include at least one common electrode 468 disposed between second alignment layer 466B and second lens substrate 456B. In one example, common electrode 468 may be formed as a unitary layer overlapping all or substantially all of liquid crystal layer 442, driving electrodes 458, and floating electrodes 464. In certain examples, GRIN LC lens 440 may include multiple common electrodes 468 that together cover or substantially cover liquid crystal layer 442. An electric field may be generated between common electrode 468 and driving electrodes 458 and/or floating electrodes 464 when selected voltages are applied to common electrode 468 and driving electrodes 458. In various examples, common electrode 468 may be held at a single selected voltage and, in combination with driving electrodes 458 and/or floating electrodes 464, may enable a range of voltage differentials to be selectively applied to regions of liquid crystal layer 442. Accordingly, driving electrodes 458 may, in combination with common electrode 468, generate variable electric fields that reorient liquid crystal molecules in liquid crystal layer 442 to produce a desired lens phase profile.

Driving electrodes 458, floating electrodes 464, common electrode 468, and bus line 462 may include one or more electrically conductive materials, such as a semiconductor (e.g., a doped semiconductor), metal, carbon nanotube, graphene, oxidized graphene, fluorinated graphene, hydrogenated graphene, other graphene derivatives, carbon black, transparent conductive oxides (TCOs, e.g., indium tin oxide (ITO), zinc oxide (ZnO), indium gallium zinc oxide (IGZO), etc.), conducting polymers (e.g., PEDOT), and/or other electrically conductive material. In some embodiments, the electrodes may include a metal such as nickel, aluminum, gold, silver, platinum, palladium, tantalum, tin, copper, indium, gallium, zinc, alloys thereof, and the like. Further example transparent conductive oxides include, without limitation, aluminum-doped zinc oxide, fluorine-doped tin oxide, indium-doped cadmium oxide, indium zinc oxide, indium zinc tin oxide, indium gallium tin oxide, indium gallium zinc oxide, indium gallium zinc tin oxide, strontium vanadate, strontium niobate, strontium molybdate, and calcium molybdate. In some examples, the electrodes and/or bus line may each include one or more layers, grids, nanowires, etc. of any suitable transparent conductive material, such as transparent conductive oxides, graphene, etc. Driving electrodes 458, floating electrodes 464, common electrode 468, and/or bus line 462 may have an optical transmissivity of at least approximately 50%, e.g., approximately 50%, approximately 60%, approximately 70%, approximately 80%, approximately 90%, approximately 95%, approximately 97%, approximately 98%, approximately 99%, or approximately 99.5%, including ranges between any of the foregoing values.

Electrode patterns for GRIN LC lenses, as disclosed herein, may be configured to produce desired lens profiles when operated. For example, modeling may be utilized to determine and/or optimize various design parameters, such as the shapes of the electrodes, the number of driving electrodes, the number of Fresnel reset regions, the types of resistors coupling adjacent electrodes, and/or the number of bus lines to produce adequate lens shapes and provide a sufficient range of lens power while minimizing visual aberrations and delays in response time that might be perceptible to a wearer.

A "director," as used herein, may refer to an axis oriented in an average direction of long molecular axes of all liquid crystal molecules in a liquid crystal bulk or selected region thereof. Individual liquid crystal molecules may be more or less aligned with this directional axis. Accordingly, liquid crystal molecules, such as rod-like liquid crystal molecules, may be generally oriented such that their moments of inertia are roughly aligned along the director.

Figure 5:
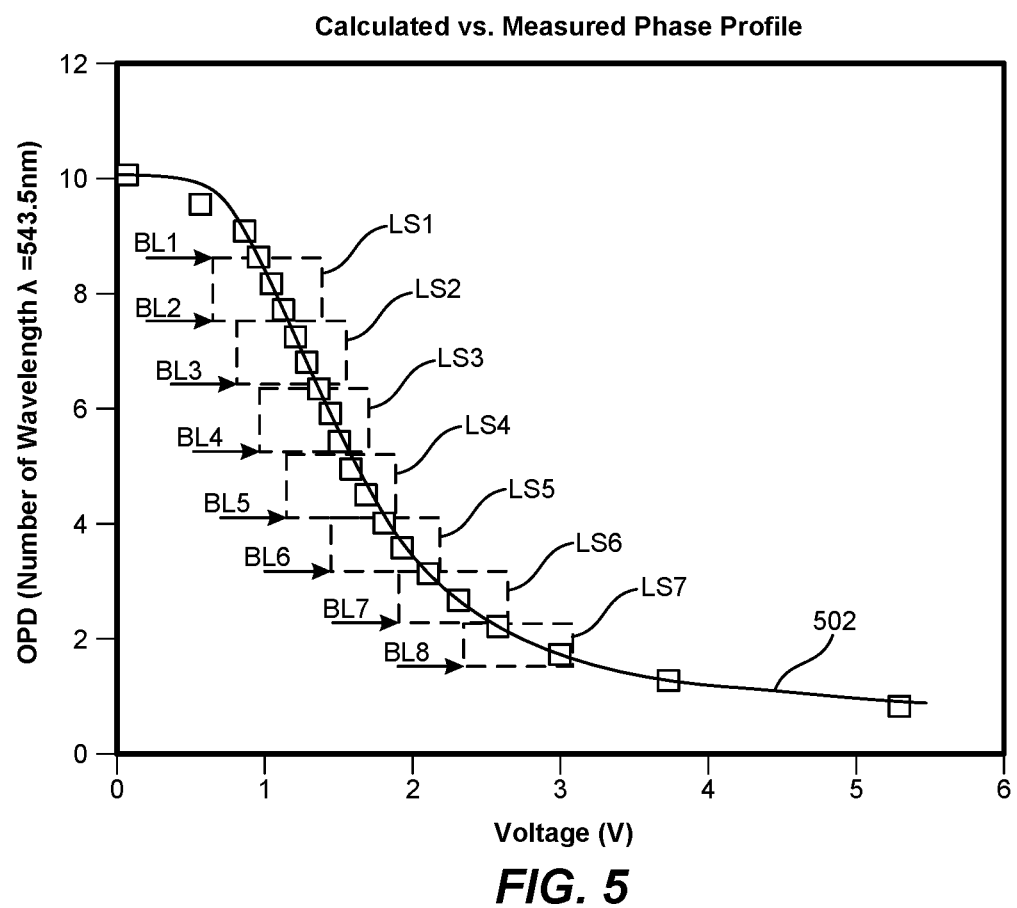
FIG. 5 is a plot illustrating a curve of optical path difference versus voltage utilized to obtain a desired liquid phase profile according to some embodiments.

FIG. 5 is a plot illustrating a curve of optical path difference versus voltage that may be utilized in director modeling to optimize certain design parameters of a GRIN LC lens as disclosed herein. In some embodiments, a liquid crystal relaxation method may be used to numerically calculate a director configuration at equilibrium. In this method, the calculation for the director configuration may be determined by minimizing the free energy for a given set of boundary conditions and external fields. This calculation may then be utilized to obtain the desired phase profile.

A GRIN LC lens design may include concentric ring-shaped electrodes (see, e.g., FIGS. 6, 7, and 10B) with substantially identical areas to produce a parabolic phase profile. With this electrode geometry, a parabolic phase may be obtained when the phase difference between adjacent electrodes is approximately the same. If the phase is proportional to the applied voltage, a linear change in the voltage across the electrodes (i.e., with approximately the same difference in voltage between any two electrodes) would yield a parabolic phase profile. To impose a linear voltage drop over several electrodes, inter-ring resistors can be utilized. The resistors between electrodes may act as voltage dividers. If the phase vs. voltage curve were in general linear, only two interconnections would be required to drive the lens. Additional resistive interconnections are utilized, however, to provide a curved phase profile, with more than three interconnections enabling a parabolic phase profile.

In various embodiments, the slope of optical path difference (OPD) vs. voltage curve 502 of a liquid crystal material, as disclosed herein, may not remain constant but may rather become substantially steeper at regions corresponding to lower voltage values. In at least one example, the non-linearity of OPD vs. voltage curve 502 may be addressed by segmenting curve 502 into a number of different linear sections that together may better approximate the profile of curve 502 in a manner that has little or no impact on perceptible optical characteristics of the resulting GRIN LC lens. As shown in FIG. 5, curve 502 is broken up into a number of linear sections LS1-LS7 (boxes surround the relevant sections of curve 502 for ease of illustration). When utilizing resistors of approximately the same value between neighboring driving electrodes, in accordance with various embodiments, voltages in each region may be reliably defined by connections to a programmable voltage source at end points of linear segments LS1-LS7 shown in FIG. 5.

While seven linear sections are shown in the illustrated example, curve 502 may be segregated into any other suitable number of linear sections. The number of linear sections may determine the number of interconnections and bus lines required to drive the GRIN LC lens. In the example illustrated in FIG. 5, eight bus lines BL1-B8, which are each supplied with a different voltage, are used to obtain linear voltage drops at linear sections LS1-LS7. Bus lines BL1-BL8 are shown at positions on curve 502 corresponding to voltage values that would be respectively applied to each of bus lines BL1-BL8. Each linear section has a linear drop in voltage between a driving electrode directly coupled to a higher voltage bus line and a driving electrode directly coupled to a lower voltage bus line. Resistors separating neighboring driving electrodes between the driving electrodes directly coupled to the bus lines may maintain a consistent voltage drop between the neighboring driving electrodes.

Figure 6:
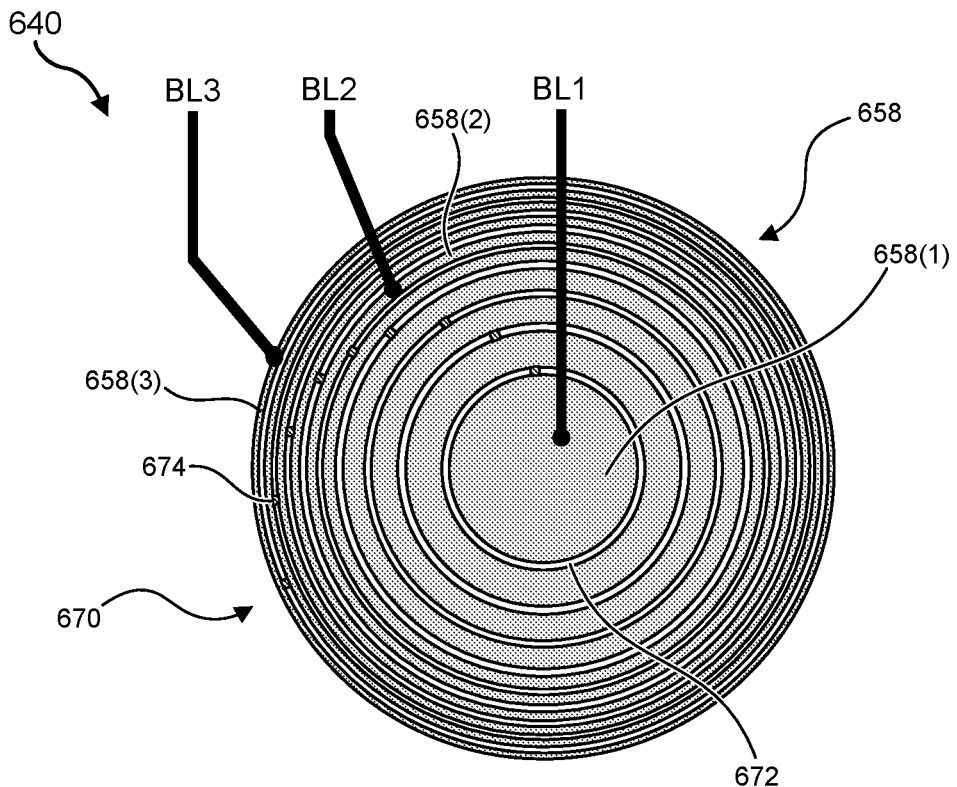
FIG. 6 illustrates driving portions an example GRIN LC lens according to some embodiments.

FIG. 6 illustrates a GRIN LC lens 640 that includes a driving electrode array 670 according to some embodiments. The illustrated driving electrode array 670 may represent a simplified patterned array presented for purposes of illustration, and various exemplary electrode arrays may include a greater number of driving electrodes and bus lines. As shown, driving electrode array 670 includes a plurality of driving electrodes 658 that are arranged in concentric rings surrounding a central, circular driving electrode 658(1). The areas covered by each of the plurality of driving electrodes 658 (i.e., the areas overlapping a corresponding liquid crystal layer) may be approximately the same. Hence, driving electrodes 658, most of which have a ring-shaped profile, may decrease in width as the electrode circumferences increase, proceeding from central driving electrode 658(1) outward. As shown, driving electrode array 670 may have a circular shape configured to overlap a circular-shaped liquid lens layer having approximately the same shape and dimensions. However, in some embodiments, driving electrode array 670 and GRIN LC lens 640 may have any other suitable profile shape, including a noncircular shape.

As shown in FIG. 6, neighboring driving electrodes 658 are separated by ring-shaped gap regions 672 (see gap $G_1$ in FIG. 4). Gap regions 672 may have widths of, for example, from approximately 0.5 μm to approximately 5 μm. Additionally, a separate resistor 674 may connect each pair of neighboring driving electrodes 658. The resistors 674 may enable each driving electrode 658 to be maintained at a different voltage when different voltages are applied via bus lines to two or more of driving electrodes 658. In some examples, consecutive resistors 674 may be located at different angular positions along driving electrode array 670. For example, neighboring resistors 674 may be separated by angular distances of from approximately 1° to approximately 10° or more.

In the example of FIG. 6, three example bus lines BL1, BL2, and BL3 are illustrated. Bus lines BL1, BL2, and BL3 are each electrically coupled (i.e., directly coupled, connected, or otherwise attached electrically) to a different driving electrode 658. In the illustrated example, bus line BL1 is electrically coupled to the center-most driving electrode 658(1) and bus line BL3 is electrically coupled to a driving electrode 658(3) located at a more peripheral position. Bus line BL2 is electrically coupled to a driving electrode 658(2) disposed between driving electrodes 658(1) and 658(3) (i.e., between the center and outer periphery of driving electrode array 670). The plurality of driving electrodes 658 may produce a varying electric field in conjunction with one or more common lines disposed on an opposite side of an overlapping liquid crystal layer (see, e.g., common electrode 468 disposed on a side of liquid crystal layer 442 opposite driving electrodes 458, as shown in FIG. 4). The electric field generated between driving electrodes 658 and the overlapping common electrode(s) may produce selected alignments of liquid crystal molecules in the liquid crystal layer. In some embodiments, the common electrode(s) may be maintained at a particular voltage value, and variations in liquid crystal alignments may correspond to different voltages of overlapping driving electrodes 658.

In at least one example, a first voltage may be applied by bus line BL1 to driving electrode 658(1) and a lower or higher voltage may be applied by bus line BL3 to driving electrode 658(3). A voltage having a value between that of bus lines BL1 and BL3 may be applied by bus line BL2 to driving electrode 658(2). In some examples, voltages of driving electrodes 658 may decrease or increase linearly or substantially linearly between pairs of bus lines (see, e.g., linear sections LS1-LS7 between pairs of bus lines BL1-BL8 shown in FIG. 5). This may be accomplished by, for example, providing resistors 674 that have substantially the same value between each pair of neighboring driving electrodes 658. Accordingly, voltage drops between neighboring driving electrodes 658 located between two bus lines (e.g., between bus lines BL1 and BL2 and/or between bus lines BL2 and BL3) may be relatively consistent.

In at least one embodiment, amounts of voltage drop or increase between adjacent driving electrodes 658 and/or between neighboring bus lines may be substantially constant. Because the radial width of driving electrodes 658 progressively decreases proceeding from the center of driving electrode array 670 outward, the voltage changes may likewise change at progressively smaller intervals proceeding radially outward. The decreasing radial intervals between driving electrodes 658 may result in progressively greater changes in liquid crystal orientation proceeding radially outward along the GRIN LC lens so that a selected lens curvature (e.g., a spherical curvature) is applied to light passing through the GRIN LC lens. For example, in one embodiment, bus line BL1 may apply approximately 4 V to the center-most driving electrode 658(1) and bus line BL3 may apply approximately 0 V to the outer-most driving electrode 658(3). In this example, bus line BL2 may apply approximately 2 V to driving electrode 658(2), which is disposed at a location between driving electrodes 658(1) and 658(3). Driving electrode 658(2) may be located such that the number of driving electrodes 658 located between driving electrodes 658(1) and 658(2) is the same or nearly the same as the number of driving electrodes 658 located between driving electrodes 658(2) and 658(3).

In various embodiments, voltage drops between different pairs of bus lines may have different slopes so as to produce a desired lens profile in the GRIN LC lens. Any suitable combination of voltage values may be applied to bus line BL1-BL3 to a selected electrical field gradients in an overlapping liquid crystal layer. For example, a total voltage drop between bus lines BL2 and BL3 may be more or less steep than a total voltage drop between bus lines BL1 and BL2.

Figure 7:
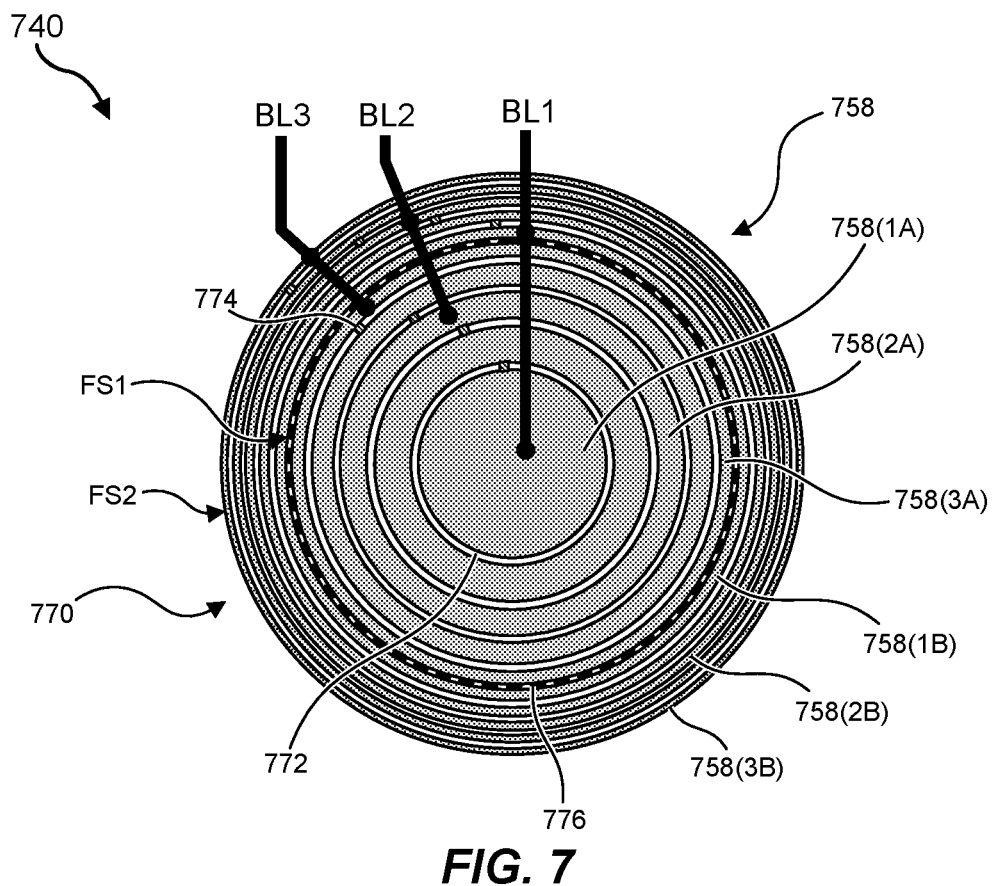
FIG. 7 illustrates driving portions of an example GRIN LC lens having two Fresnel reset regions according to some embodiments.

FIG. 7 illustrates a GRIN LC lens 740 that includes a driving electrode array 770, in accordance with some embodiments. The illustrated driving electrode array 770 may represent a simplified array and Fresnel layout presented for purposes of illustration, and various exemplary electrode arrays may include a greater number of driving electrodes, bus lines, and/or Fresnel lens segments. As shown, driving electrode array 770 includes a plurality of driving electrodes 758 that are arranged in concentric rings. As shown, driving electrode array 770 may have a circular shape configured to overlap a circular-shaped liquid lens layer having approximately the same shape and dimensions. However, in some embodiments, driving electrode array 770 and GRIN LC lens 740 may have any other suitable profile shape, including a noncircular shape.

Driving electrode array 770 may be divided into a plurality of Fresnel lens segments or driving zones. In the example shown in FIG. 7, driving electrode array 770 is divided into first and second driving zones FS1 and FS2. Driving zones FS1 and FS2 may be utilized to generate Fresnel resets in a phase profile of GRIN LC lens 740, as discussed in greater detail below. Neighboring driving electrodes 758 may be separated by ring-shaped gap regions 772 and resistors 774 may connect pairs of neighboring driving electrodes 758 within each of driving zones FS1 and FS2. An intermediate gap 776 may be defined between driving zones FS1 and FS2. Unlike gap regions 772 disposed between adjacent driving electrodes 758 within each driving zone, electrodes in driving zones FS1 and FS2 adjacent to intermediate gap 776 may not be electrically connected to each other via a resistor or other connector bridging the electrodes across intermediate gap 776. Accordingly, first and second driving zones FS1 and FS2 may produce distinct voltage gradients in independently operable lens regions in GRIN LC lens 740.

In the embodiment of FIG. 7, three example bus lines BL1, BL2, and BL3 are illustrated. Bus lines BL1, BL2, and BL3 are each electrically coupled (i.e., directly coupled, connected, or attached electrically) to a different respective driving electrode 758 in each of first and second driving zones FS1 and FS2. In the illustrated example, bus line BL1 is electrically coupled to each of driving electrodes 758(1A) and 758(1B), bus line BL2 is electrically coupled to each of driving electrodes 758(2A) and 758(2B), and bus line BL3 is electrically coupled to each of driving electrodes 758(3A) and 758(3B) located respectively within each of driving zones FS1 and FS2. In at least one example, a first voltage may be applied by bus line BL1 to driving electrodes 758(1A) and 758(1B) and a lower or higher voltage may be applied by bus line BL3 to driving electrodes 758(3A) and 758(3B). A voltage having a value between that of bus lines BL1 and BL3 may be applied by bus line BL2 to driving electrodes 758(2A) and 758(2B).

Driving electrode array 770 may be utilized to provide GRIN LC lens 740 with a segregated Fresnel structure. The GRIN LC lens may include any appropriate type of Fresnel structure, such as a Fresnel zone plate lens including areas that have a phase difference of a half-wave to adjacent areas, a diffractive Fresnel lens having a segmented parabolic phase profile where the segments are small and can result in significant diffraction, or a refractive Fresnel lens having a segmented parabolic profile where the segments are large enough so that diffraction effects are minimized. Other structures may also be used.

In some embodiments, the driving electrode array 770 may be utilized in a refractive Fresnel GRIN LC lens having a segmented parabolic profile, where the segments are large enough that the resulting diffraction angle is smaller than the angular resolution of human eyes (i.e., diffraction effects are not observable by human eyes). Such a refractive Fresnel LC lens may be referred to as a segmented phase profile (SPP) LC lens.

For a positive thin lens, optical path difference (OPD) can be approximated with a Maclaurin series to a parabolic profile as shown in Equation (1)

$$OPD(r) = \frac{r^2}{2f}, \qquad (1)$$

where r is the lens radius (i.e., half of the lens aperture) and f is the focal length. The OPD of an LC lens is proportional to the cell thickness d and the birefringence Δn of the LC material as shown in Equation (2)

$$OPD = \Delta n \times d \rightarrow d \propto r^2 \quad (2)$$

The response time τ of an Electrically Controlled Birefringence (ECB) LC cell, which is the time the material requires to recover to its original state, is quadratically dependent on cell thickness d (τ∝r⁴) as shown in Equation (3)

$$\tau = \frac{(\gamma \times d^2)}{(K_{22} \times \pi^2)}, \quad (3)$$

where γ and $K_{22}$ are the rotational viscosity and the splay elastic constant of the LC material, respectively. As equations (1)-(3) show, there is typically a tradeoff between the aperture size and response time. Thus, designing a GRIN LC lens with large aperture and reasonable response time has conventionally presented challenges. In the disclosed embodiments, by introducing phase resets (i.e., Fresnel resets) in the parabolic phase profile, the aperture size of the LC lens may be increased without compromising the response time.

Figure 8A:
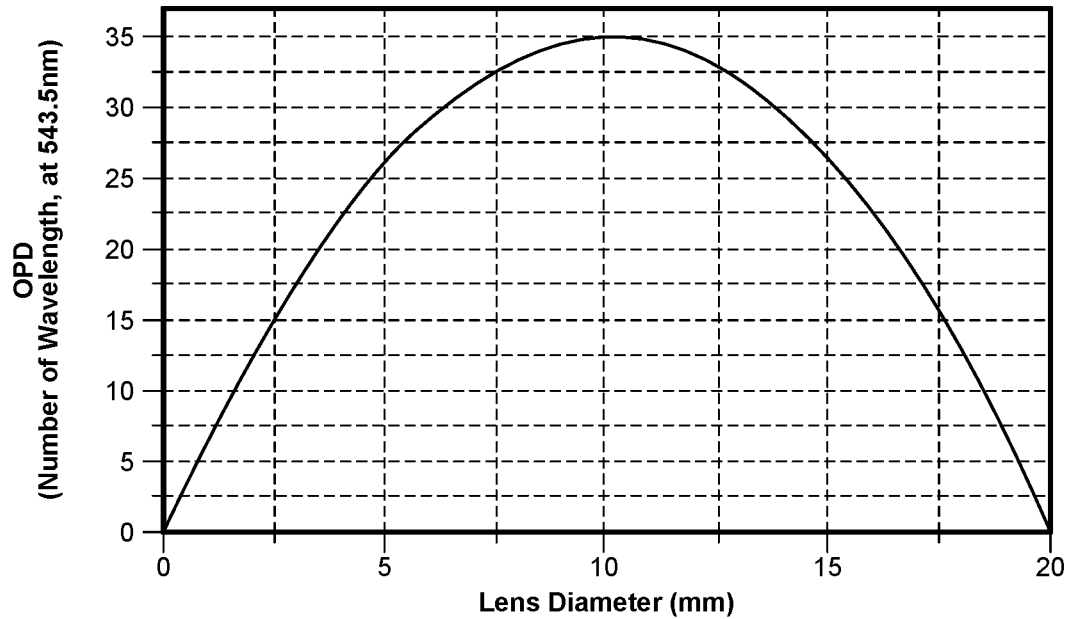
FIG. 8A is a plot showing an ideal parabolic phase profile for an example GRIN LC lens according to some embodiments.

FIG. 8A illustrates an exemplary target parabolic phase profile for a ±0.375 Diopter (D) GRIN LC lens having a lens diameter of 20 mm, where the OPD equals to 35 λ. The thickness of the LC cell for this lens would be approximately 70 μm for LC materials having a birefringence value of 0.27. To decrease the effective thickness of the LC cell, resets or segments may be introduced into the lens phase profile.

Figure 8B:
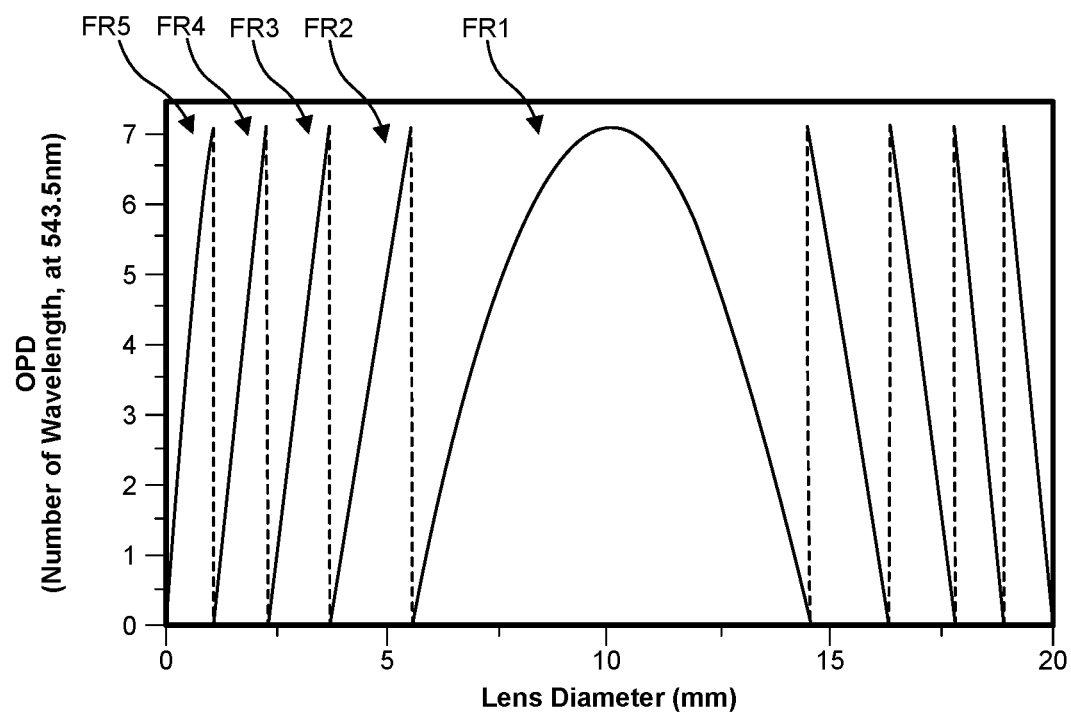
FIG. 8B is a plot showing a 2-dimensional (2D) phase map for an example GRIN LC lens having five Fresnel resets according to some embodiments.

FIG. 8B illustrates a phase map of an exemplary GRIN LC lens having five Fresnel resets FR1-FR5 that together approximate the lens characteristics of the idealized phase profile of FIG. 8A. As shown, the centermost Fresnel reset FR1 may occupy a wide area surrounding the center of the GRIN LC lens. Additional Fresnel resets FR2-FR5 surrounding central Fresnel reset FR1 may have thicknesses that are sequentially reduced, proceeding peripherally outward toward the lens periphery. For example, Fresnel reset FR2 may be radially thinner than Fresnel reset FR1. Additionally, Fresnel reset FR3 may be radially thinner than Fresnel reset FR2, Fresnel reset FR4 may be radially thinner than Fresnel reset FR3, and Fresnel reset FR5 may be radially thinner than Fresnel reset FR4. The phase profiles of each of Fresnel resets FR1-FR5 may likewise increase in conjunction with decreases in thickness of the resets. For example, Fresnel reset FR5 may have a steeper profile than Fresnel reset FR4, which has a steeper profile than Fresnel reset FR3. Fresnel reset FR3 may likewise have a steeper profile than Fresnel reset FR2, which has a steeper profile than central Fresnel reset FR1.

Figure 8C:
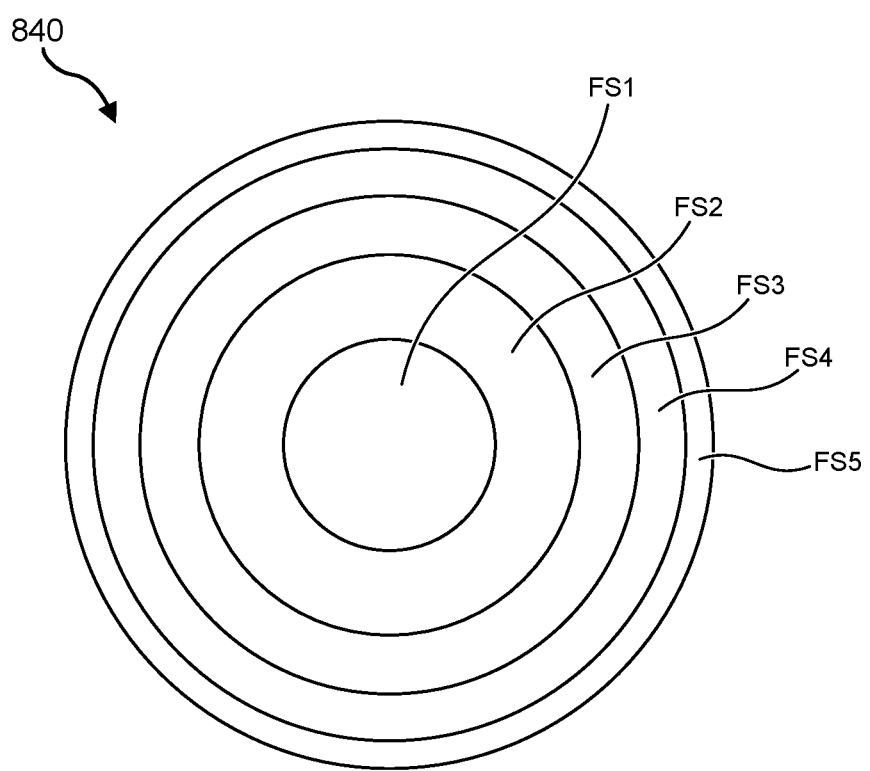
FIG. 8C illustrates an example GRIN LC lens including five Fresnel lens segments for producing five Fresnel resets as shown in FIG. 8B according to some embodiments.

FIG. 8C illustrates an exemplary GRIN LC lens 840 that includes a plurality of concentric ring-shaped lens segments of increasing radii that are referred to as Fresnel lens segments, which may correspond to and include driving zones of a driving electrode array (see, e.g., FIG. 7). As shown in FIG. 8C, GRIN LC lens 840 may have five driving zones FS1-FS5 respectively corresponding to the five Fresnel resets FR1-FR5 mapped in FIG. 8B. As shown in FIG. 8C, driving zone FS1 may be centrally located and driving zones FS2-FS5 may concentrically surround driving zone FS1. For example, driving zone FS2 may circumferentially surround central driving zone FS1, Fresnel lens segment FS3 may circumferentially surround Fresnel lens segment FS2, Fresnel lens segment FS4 may circumferentially surround Fresnel lens segment FS3, and outermost Fresnel lens segment FS5 may circumferentially surround Fresnel lens segment FS4. In correspondence with variations in thicknesses of Fresnel resets FR1-FR5 as shown in FIG. 8B, FIG. 8C likewise shows that Fresnel lens segments FS1-FS5 may progressively decrease in lateral thickness proceeding from the centermost Fresnel lens segment FS1 outward.

The five Fresnel lens segments FS1-FS5 of GRIN LC lens 840 may enable the corresponding LC cell thickness of GRIN LC lens 840 to be reduced up to five times, resulting in an LC cell thickness as low as approximately 14 μm. Likewise, the response time of the illustrated GRIN LC lens may be improved by a factor of up to 25. That is, the introduction of the Fresnel resets in the GRIN LC lens phase profile may enable the optical power of GRIN LC lens 840 to be adjusted sufficiently fast to keep pace with human eye accommodation (e.g., accommodation may occur in approximately 300 ms) such that the vergence-accommodation conflict may be substantially or fully resolved. The number of Fresnel resets/segments in a particular lens may be determined based on specific configurations of the Fresnel structure and the GRIN LC lens requirements, such as the desired optical power, lens aperture, switching time, and/or image quality of the GRIN LC lens.

Figure 9A:
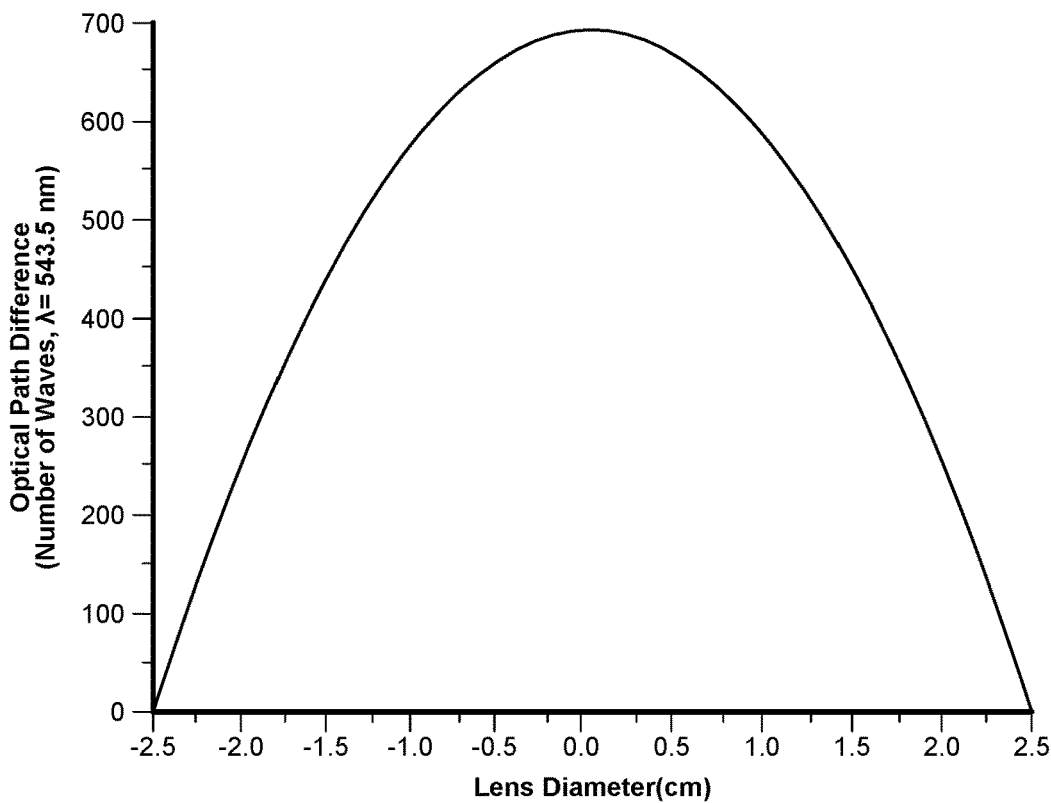
FIG. 9A is a plot showing an ideal parabolic phase profile for an example large-diameter GRIN LC lens according to some embodiments.

FIG. 9A illustrates an exemplary target parabolic phase profile for a GRIN LC lens having a greater width and focal range than that shown in FIG. 8A. For example, the GRIN LC lens mapped in FIG. 9A has a focal range of ±1.20 D, a lens diameter of 50 mm (5.0 cm), and an OPD that equals to approximately 700 λ for a green wavelength of 543.5 nm.

Figure 9B:
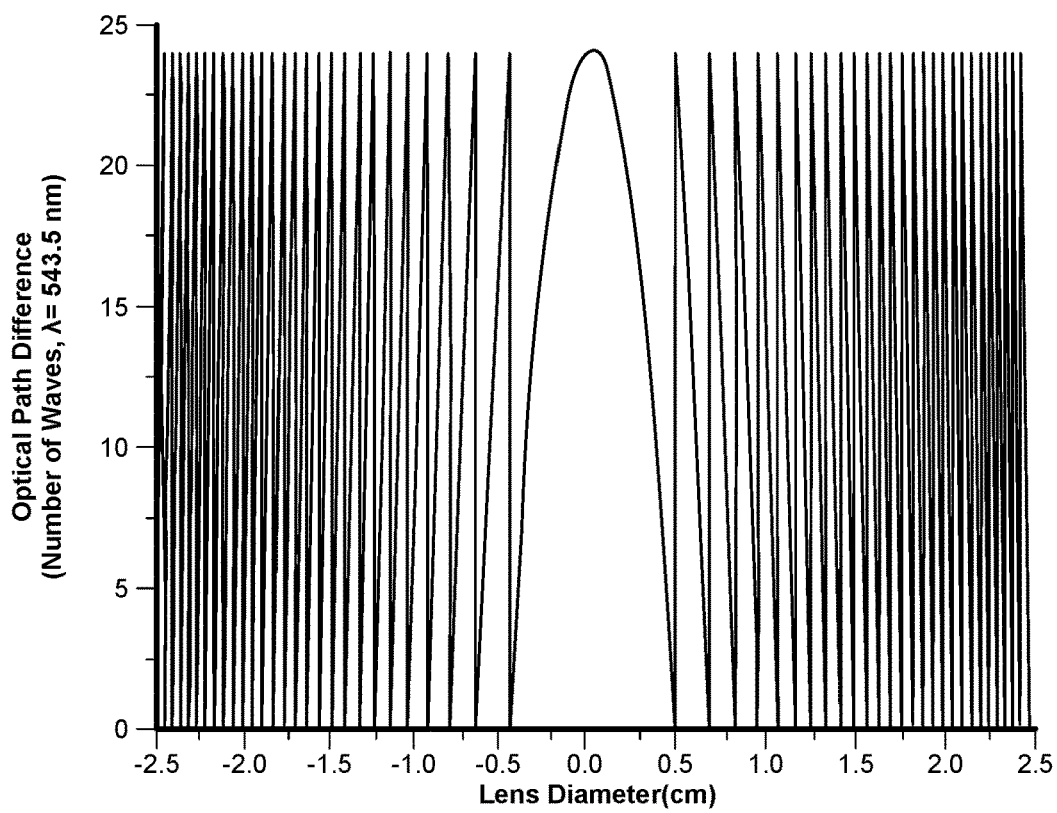
FIG. 9B is a plot showing a 2D phase map for an example large-diameter GRIN LC lens having 28 Fresnel resets according to some embodiments.

FIG. 9B illustrates a phase map of an exemplary GRIN LC lens having a total of 28 Fresnel resets that together approximate the lens characteristics of the idealized phase profile of FIG. 9A. A large number of phase steps within one wavelength of OPD (i.e., a large number of phase steps per wavelength) may be desired to produce a more accurate representation of an idealized phase profile. The 28 Fresnel resets may enable a substantial reduction in the LC cell thickness and improvement in response time. To configure a GRIN LC lens with negligible diffraction angle for near eye applications, the minimum width of Fresnel lens segments of the GRIN LC lens may be selected to be larger than 1.03 mm. The resets may be formed in a single GRIN LC layer (e.g., a 60 μm thick layer) or distributed in multiple stacked GRIN LC layers (e.g., three stacked 20 μm thick layers). In some examples, GRIN LC layers may be stacked to further improve the response time of the overall GRIN LC lens. By way of example, a pair of optically coupled GRIN LC lens layers, with each layer having five resets in their phase profile, may enable the resulting LC cell thickness to be reduced up to 10 times (5 resets multiplied by 2 layers) and, accordingly, the response speed may be improved by a factor of approximately 100.

Figure 10A:
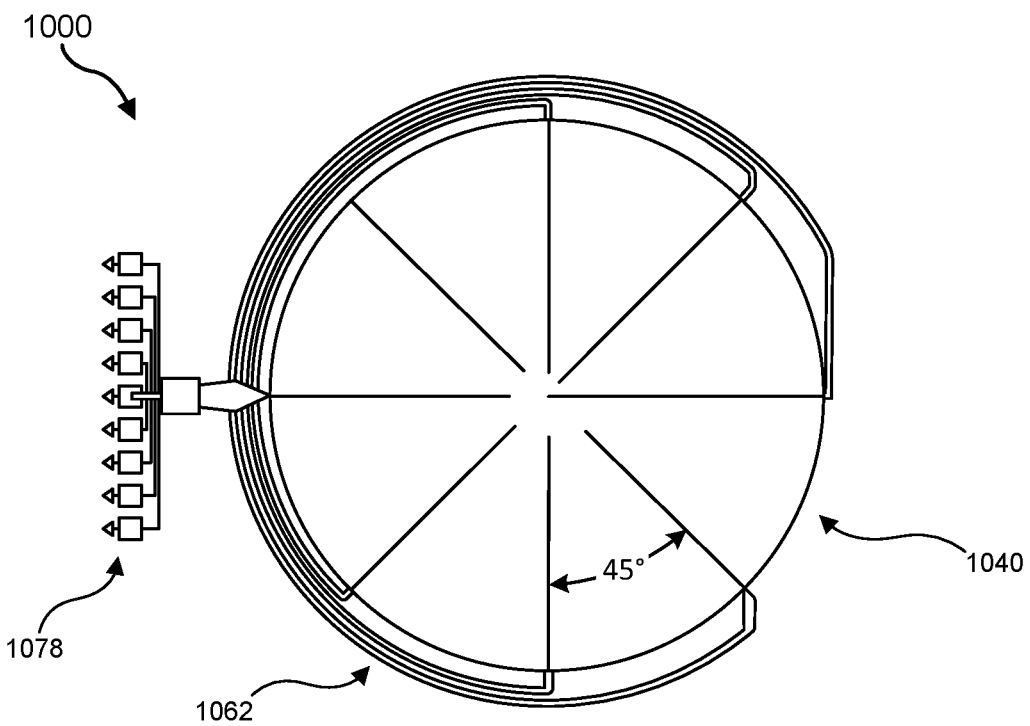
FIG. 10A illustrates an example GRIN LC system that includes an electrode array and a plurality of bus lines according to some embodiments.
Figure 10B:
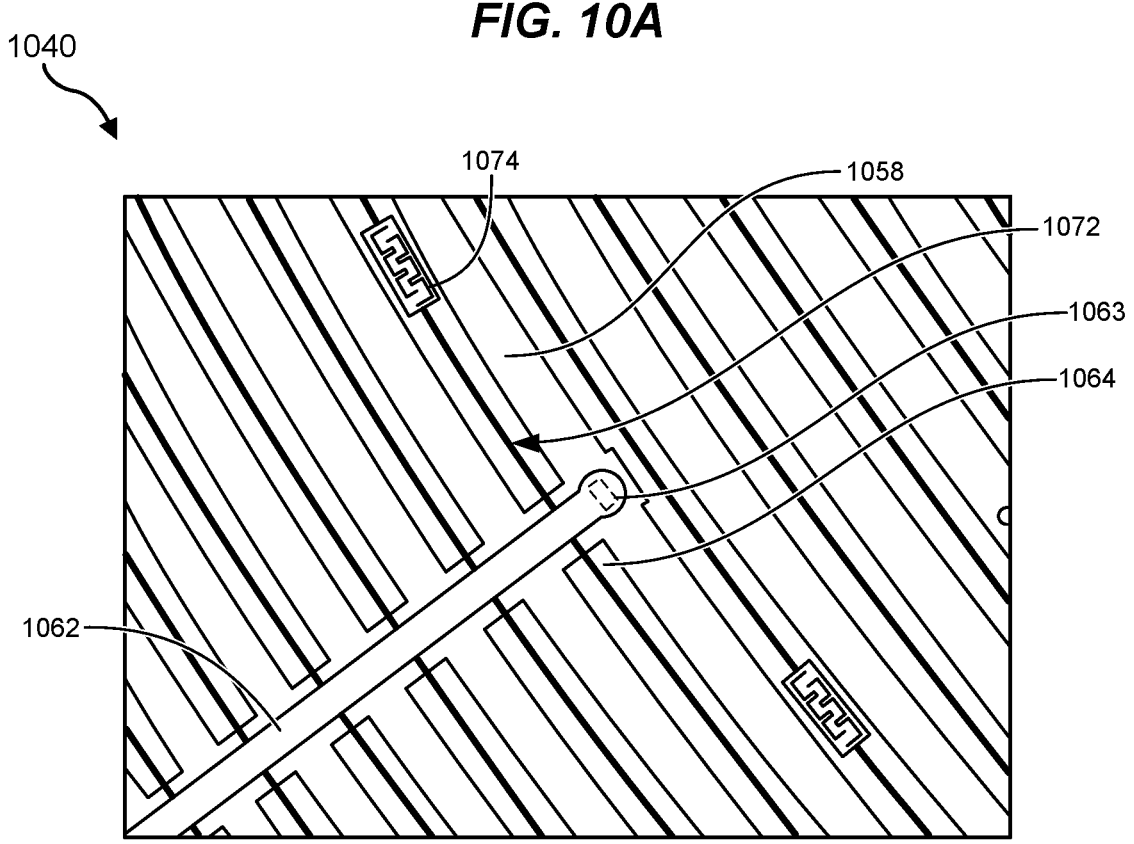
FIG. 10B shows a close-up view of a portion of the GRIN LC system illustrated in FIG. 10A according to some embodiments.

FIGS. 10A and 10B show a GRIN LC system 1000 and GRIN LC lens 1040 that includes an electrode array and bus lines according to various embodiments. As shown in FIG. 10A, GRIN LC system 1000 includes a plurality of bus lines 1062 that are electrically coupled to driving electrodes of GRIN LC lens 1040. For example, GRIN LC system 1000 may include eight bus lines 1062 as shown, with each of the eight bus 1062 lines being disposed at a different angular position about GRIN LC lens 1040. The bus lines 1062 may, for example, be evenly spaced apart from each other at regular angular intervals of approximately 45°, with each bus line extending from a peripheral position towards the center of GRIN LC lens 1040. Accordingly, portions of bus lines 1062 on GRIN LC lens 1040 may extend along radial lines located at angular positions of approximately 0°, 45°, 90°, 135°, 180°, 225°, 270°, and 315°. While GRIN LC lens 1040 shown in FIG. 10A has a substantially circular profile, GRIN LC lens 1040 may alternatively have any other suitable non-circular shape in some embodiments. Bus lines 1062 may extend between GRIN LC lens 1040 and terminals 1078, which may be connected to an external voltage source and controller that is configured to apply different voltages to terminals 1078 and corresponding bus lines 1062. Additionally, at least one of terminals 1078 may be coupled to a common electrode (see, e.g., common electrode 468 in FIG. 4) and may apply a common voltage to the common electrode.

FIG. 10B shows a close-up view of a portion GRIN LC lens 1040 illustrated in FIG. 10A. As shown, GRIN LC lens 1040 may include a plurality of concentrically arranged driving electrodes 1058 that are separated from each other by gap regions 1072 (see, e.g., gap G1 in FIG. 4; see also gap region 672 and 772 in FIGS. 6 and 7). Adjacent driving electrodes 1058 may be electrically coupled to each other by resisters 1074 that bridge the intervening gap region 1072 to maintain a selected voltage drop between the driving electrodes 1058. Additionally, concentrically arranged floating electrodes 1064 may be disposed over portions of driving electrodes 1058 so as to overlap gap regions 1072 disposed between adjacent driving electrodes 1058. A portion of a bus line 1062 coupled to one of the illustrated driving electrodes 1058 is shown in FIG. 10B. As shown, bus line 1062 is electrically coupled to a driving electrode 1058 by a via interconnect 1063 extending directly between the bus line 1062 and the driving electrode 1058. Bus line 1062 shown in FIG. 10B may be separated from other driving electrodes 1058 by an insulating layer (see, e.g., insulating layer 460 in FIG. 4).

In some examples, each bus line 1062 may be coupled to a corresponding driving electrode 1058 within each of a plurality of Fresnel lens segments (see, e.g., Fresnel lens segments FS1 and FS2 in FIG. 7; see also Fresnel lens segments FS1-FS5 in FIG. 8C). For example, each bus line 1062 may extend from an outer periphery of the driving electrode array of GRIN LC lens 1040 towards a center of GRIN LC lens 1040. Accordingly, in this example, each bus line 1062 may cross over each of a plurality of concentric Fresnel lens segments. Via interconnects, such as via interconnect 1063 shown in FIG. 10B, may electrically couple each bus line 1062 to a corresponding driving electrode 1058 within each respective Fresnel lens segment. Accordingly, the eight bus lines 1062 shown in FIG. 10A may be configured to simultaneously apply voltages to corresponding driving electrodes 1058 within each of a plurality of Fresnel lens segments.

Figure 11:
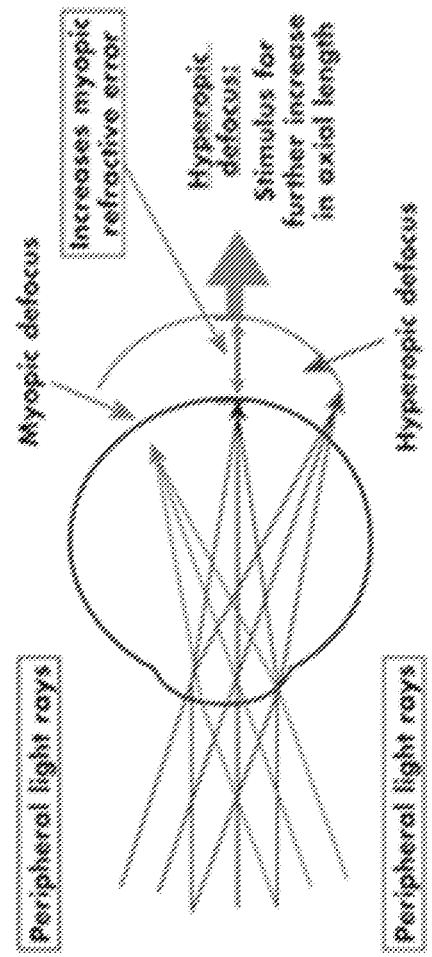
FIG. 11 is a diagram illustrating peripheral hyperopic defocus and myopic defocus in a human eye according to some embodiments.
Figure 11:
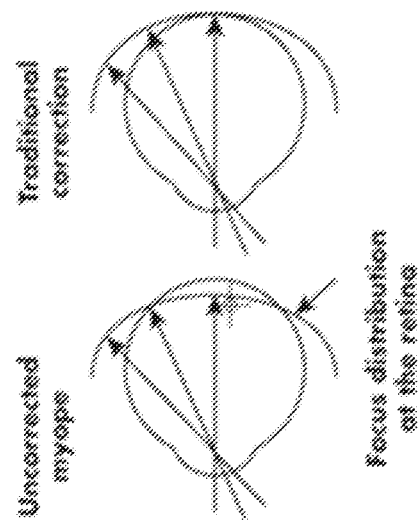

FIG. 11 is a diagram illustrating peripheral hyperopic and myopic defocus in a human eye. With hyperopic defocus, peripheral images (i.e., peripheral light rays as shown) may be focused at a region behind the retina, regardless of the focus of central images on the retina. Peripheral hyperopic defocus is commonly believed to cause eyeball growth that may result in myopia (i.e., nearsightedness). Relaxation of optical power gradually, proceeding from the lens center toward the periphery, as disclosed herein may beneficially help to reduce hyperopic defocus in the eyes of viewers.

Figure 12:
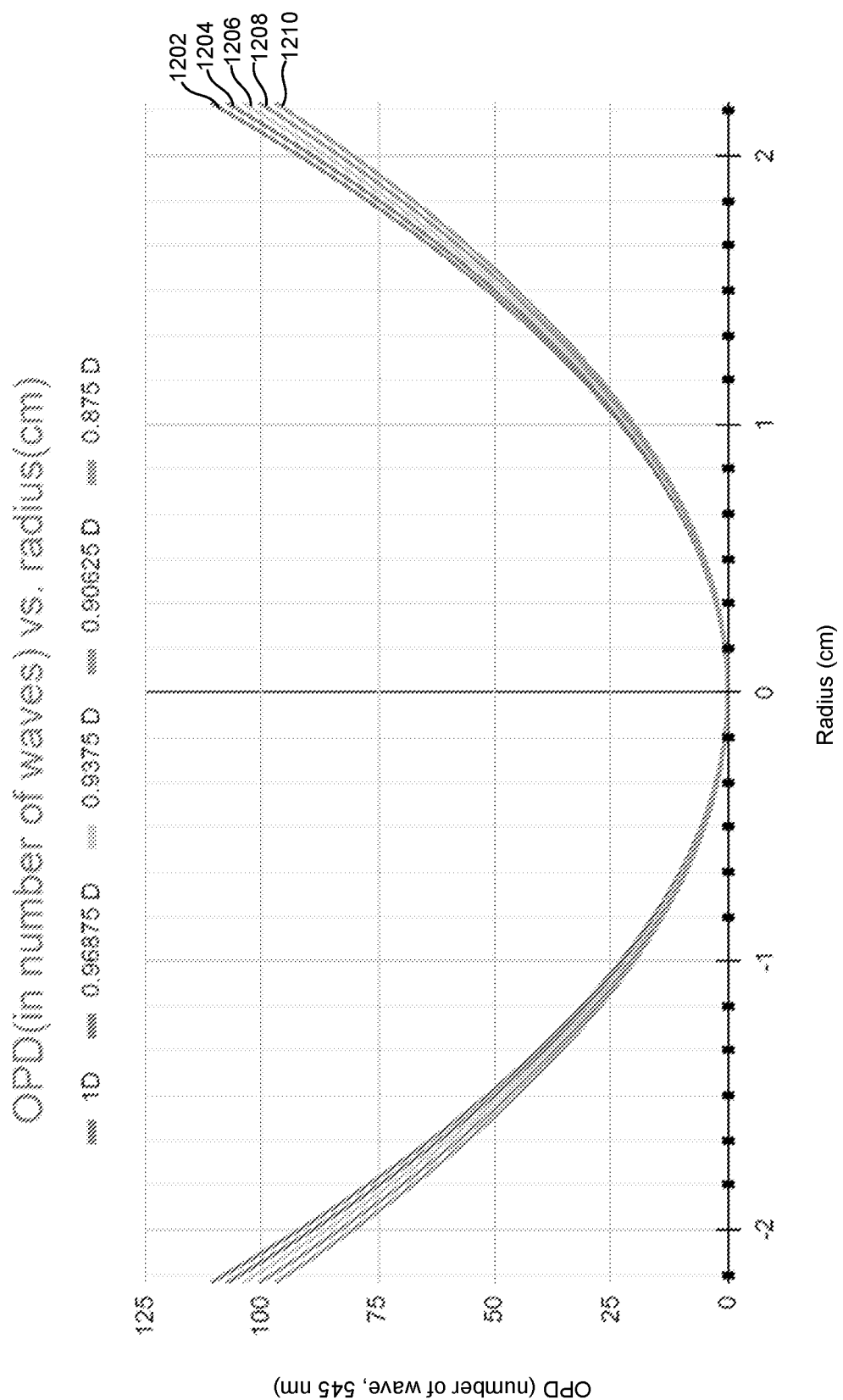
FIG. 12 is a plot illustrating ideal parabolic phase profiles for GRIN LC lenses at different optical powers according to some embodiments.

FIG. 12 is a plot illustrating OPD versus radius for various GRIN LC lenses at different diopters. The GRIN LC lenses represented in this figure each have a single optical power across the entire lens and are illustrated as ideal lens phase profiles. As shown in this figure, the OPD decreases with decreasing lens power, with the differences in OPD being more pronounced moving from the lens center toward the outer periphery. For example, as illustrated, a lens 1202 has a diopter of 1 D, a lens 1204 has a diopter of 0.96875 D, a lens 1206 has a diopter of 0.9375 D, a lens 1208 has a diopter of 0.90625 D, and a lens 1210 has a diopter of 0.875 D. The phase profiles of lenses 1202-1210 differ to increasing extents proceeding from the center to the outer peripheries of the lenses.

Figure 13:
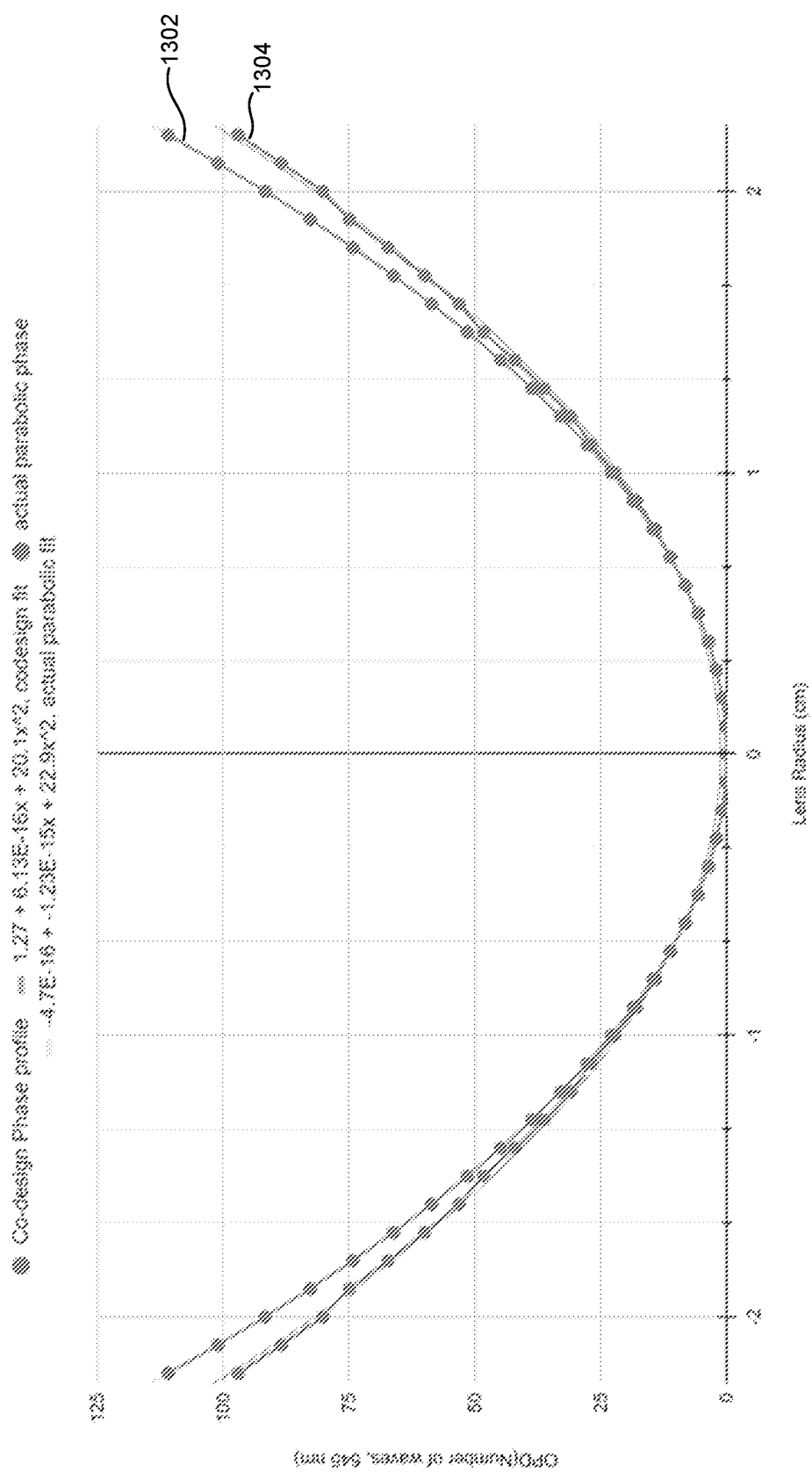
FIG. 13 is a plot illustrating a co-design phase profile and a parabolic phase profile for different GRIN LC lenses according to some embodiments.

FIG. 13 is a plot illustrating OPD versus radius for an example GRIN LC lens having a co-design phase profile 1304 in accordance with embodiments shown and described herein. For comparison, the plot also shows the OPD versus radius for an example ideal-phase GRIN LC lens having a parabolic profile 1302 (see, e.g., FIG. 12). As seen in FIG. 13, the co-design phase profile 1304 gradually transitions at various lens radius locations such that the lens power is reduced in a stepwise manner proceeding from the center of the lens outward towards the lens periphery. Table 1 shows the optical power of the lenses at various radial distances represented in FIG. 13. Table 2 shows total OPD values and numbers of Fresnel resets required for GRIN LC lenses having different optical powers.

TABLE 1

GRIN LC Lens Powers at Different Radial Distances

| | Ideal GRIN LC Lens | | Co-Design GRIN LC Lens | |
|---|---|---|---|---|
| Radial Distance (cm) from lens center | Total Power (D) | Deviation from designed power, dP (D) | Total Power (D) | Deviation from designed power, dP (D) |
| 0 | 1 | 0 | 1 | 0 |
| 5 | 1 | 0 | 0.96875 | 0.03125 |
| 10 | 1 | 0 | 0.9375 | 0.0625 |
| 15 | 1 | 0 | 0.90625 | 0.09375 |
| 20 | 1 | 0 | 0.875 | 0.125 |

TABLE 2

Lens OPD Values and Fresnel Resets

| | 1D | 0.875D |
|---|---|---|
| Required total OPD | 111 | 97 |
| Required number of resets | 22.2 | 19.4 |

As can be seen in the FIG. 13 and Tables 1 and 2, a GRIN LC lens with a co-design phase profile may require a reduced number of Fresnel resets in comparison to a lens having an ideal parabolic profile. Hence, light scattering from resets and diffraction angle due to phase mismatch may also be reduced. The co-design phase profile may be produced in any suitable manner. For example, a driving electrode array may be formed with electrode areas and spacings formed to produce the modified phase profile when bus line voltages, as described above, are applied to target driving electrodes. Additionally or alternatively, resistors electrically connecting adjacent driving electrodes may be adjusted in a manner that results in desired voltage drops over driving electrodes within specified Fresnel reset zones. Bus line voltages may also be selected to produce desired driving voltages and phase profiles over Fresnel reset zones. In some examples, additional bus lines may be utilized and/or resistors may be utilized between bus lines and selected driving electrodes to modify voltages applied to driving electrodes within various Fresnel reset zones.

According to at least one embodiment, the GRIN LC lens may be divided into a plurality of lens segments that are concentrically arranged proceeding from a center to a radially outer periphery of the lens (see, e.g., FIGS. 7-9B). An optical power of a first lens segment of the plurality of lens segments (for example, a central lens segment) may be greater than an optical power of a second lens segment of the plurality of lens segments disposed radially outward relative to the first lens segment. An optical power of a third lens segment of the plurality of lens segments that is disposed radially outward relative to the second lens segment may be less than the optical power of the second lens segment. The optical power may be further reduced for any suitable number of lens segments proceeding radially outward such that the phase profile of the co-design GRIN LC lens is closer to the ideal lens profile near the center and diverges increasingly proceeding outward towards the lens periphery.

According to at least one embodiment, a co-design GRIN LC lens (see, e.g., FIGS. 7-9B) may include a first electrode electrode layer, a second electrode layer, and a liquid crystal layer disposed between the first electrode layer and the second electrode layer. The GRIN LC lens may be divided into a plurality of lens segments that are concentrically arranged proceeding from a center to a radially outer periphery of the lens. An optical power of a first lens segment of the plurality of lens segments may be greater than an optical power of a second lens segment of the plurality of lens segments disposed radially outward relative to the first lens segment.

The GRIN LC lens may include a third lens segment that is disposed radially outward relative to the second lens segment and the optical power of the third lens segment may be less than the optical power of the second lens segment. The GRIN LC lens may also include any suitable number of additional lens segments of suitable optical powers, such as decreased optical power proceeding toward an outer lens periphery. The GRIN LC lens may also include a plurality of bus lines coupled to the first electrode layer and a controller that applies a different voltage to each of the plurality of bus lines.

In some examples, the first electrode layer may include a driving electrode array divided into a plurality of driving zones. Each of the driving zones of the plurality of driving zones may be positioned in a separate lens segment of the plurality of lens segments. In at least one example, each driving zone may include a plurality of driving electrodes consecutively arranged along a radial direction extending outward from the center and adjacent driving electrodes in a driving zone of the plurality of driving zones may be coupled to each other by a resistor. A plurality of bus lines may be coupled to the driving electrode array and each bus line of the plurality of bus lines may be electrically coupled to each driving zone of the plurality of driving zones. Accordingly, the bus lines may each drive a plurality of driving zones simultaneously.

In some examples, each bus line of the plurality of bus lines may be electrically coupled to a different driving electrode of the plurality of driving electrodes in each driving zone of the plurality of driving zones (see, e.g., FIGS. 7, 10A, and 10B). A resistor coupling two adjacent driving electrodes may be configured to maintain a voltage difference between the two adjacent driving electrodes during operation. In at least one example, the plurality of driving electrodes in a driving zone may each overlap an area having approximately the same size.

In some embodiments, each driving zone may be electrically separated from other driving zones of the plurality of driving zones. Adjacent driving electrodes may be separated from each other by a gap region extending between the adjacent driving electrodes. In at least one example, each of the plurality of driving zones may extend along an arcuate path (e.g., a circular path, an annular path, etc.).

According to at least one embodiments, the plurality of driving zones may each be configured to produce a different optical power in a corresponding lens segment of a plurality of lens segments of the lens when voltages are applied by the first electrode layer to the liquid crystal layer. In some examples, the overall lens diopter(s) may be changed by changing the voltages applied by the bus lines such that different optical powers are produced in each lens segment.

Figure 14:
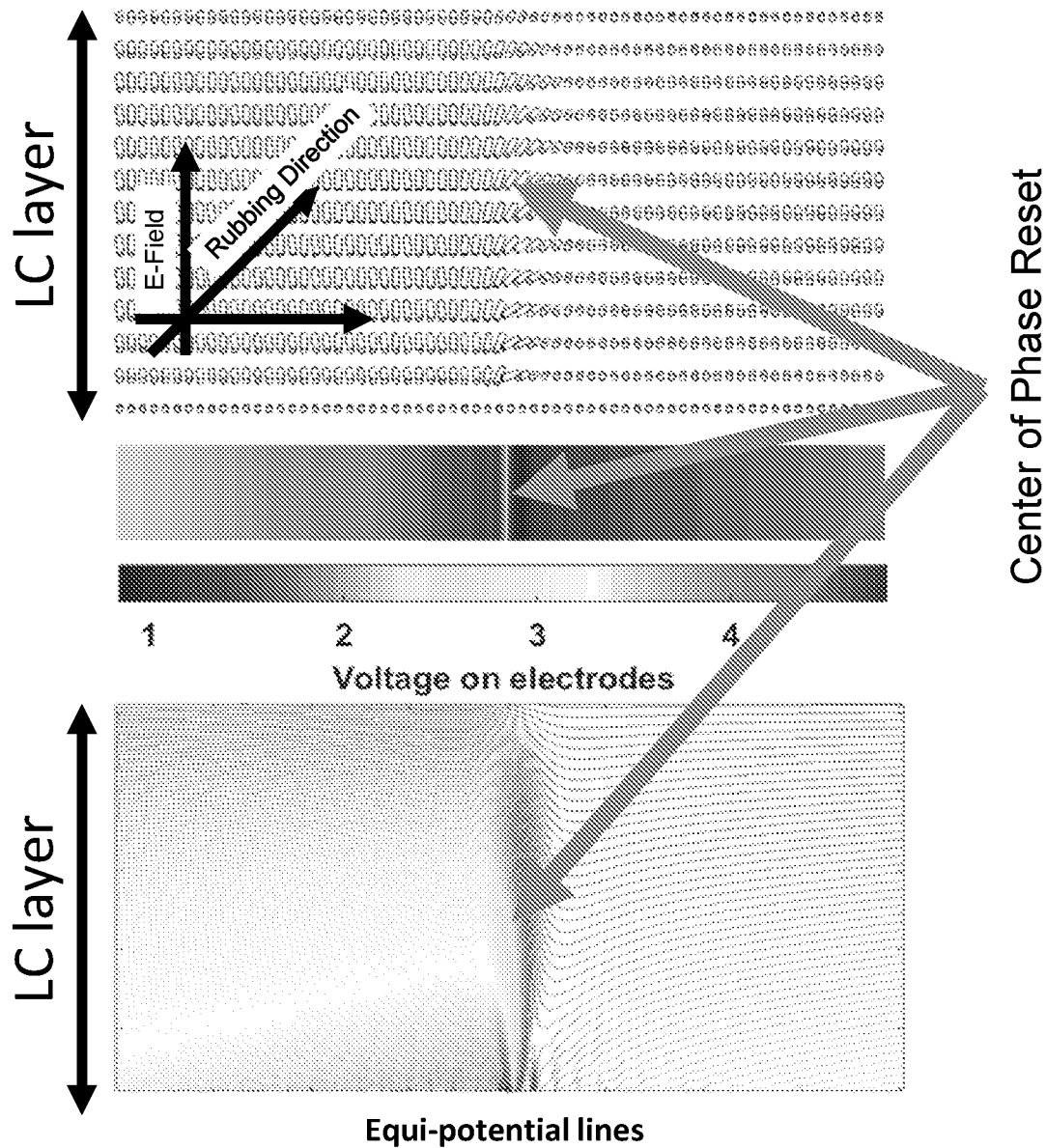
FIG. 14 illustrates light scattering from boundary regions between Fresnel resets in a GRIN LC lens according to some embodiments.

FIG. 14 illustrates light scattering from boundary regions between Fresnel resets in a GRIN LC lens. As shown, voltage variations at the phase reset boundary zone may cause a noticeable fringe field effect, with the effect being most noticeable at the center of the phase reset boundary where the voltage difference is most pronounced. As illustrated, E-field lines may bend at the phase reset boundary, resulting in out-of-place LC director tilt within the region surrounded by the dashed box in FIG. 14.

In some examples, light passing through the boundary region between the reset zones may be scattered in undesirable directions due to director distortion in the LC layer at the boundary region, as represented by the arrow exiting the boundary region in a different direction. As the reset density increases towards the periphery of the lens area, the scattering may likewise increase due to the higher density of boundary regions. Accordingly, the diffraction efficiency may gradually drop approaching the lens periphery. If the reset number is reduced due to optical power reduction, the total amount of scattered light will be reduced. Accordingly, a GRIN LC lens having a co-design phase profile, as shown in FIG. 13, may exhibit greater optical clarity and reduced light scattering.

In various embodiments, GRIN LC lens performance may be largely wavelength dependent and the illustrated simulations represent results obtained with green light having a wavelength of about 545 nm. As seen in the simulations, in the worst cases, a diffracted image may be distracting to a viewer due to phase mismatch conditions at the phase reset boundaries. These unfavorable phase mismatch conditions can be more apparent in quarter wave ($\phi=\lambda/4$) and even more apparent in half wave ($\phi=\lambda/2$) conditions. The angles of diffracted images may increase as the Fresnel reset zones become narrower towards outer regions of a GRIN LC lens. Accordingly diffracted image distortion may become more noticeable and may become more distracting to a viewer at outer radial regions of the GRIN LC lens. For example, increased effects of diffraction distortion may be evident at radial locations of 0°, 14°, 27°, 37°, and 45° from the lens center. Utilizing optical power reduction in a GRIN LC lens proceeding radially outward, as described herein (see, e.g., FIG. 13) may reduce the number of required Fresnel reset zones and may result in larger reset zones at or near the radial periphery of the lens. Accordingly, the disclosed systems may help to reduce diffraction distortion at peripheral regions to provide a more acceptable image to viewers.

Figure 15:
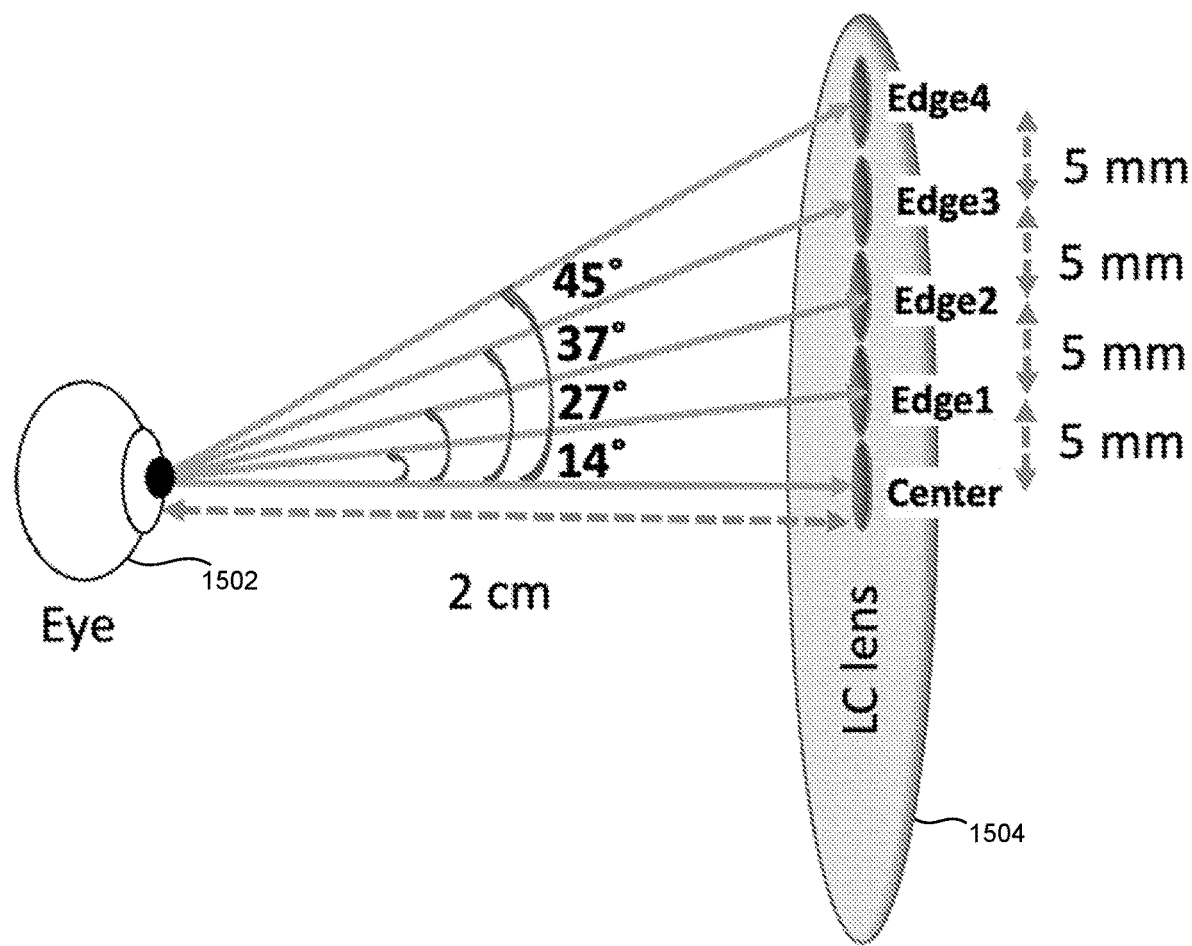
FIG. 15 shows a diagram illustrating a field of view (FOV) of a human eye viewing images through a GRIN LC lens according to some embodiments.

FIG. 15 shows a diagram illustrating a field of view (FOV) of a human eye 1502 viewing images through a GRIN LC lens 1504 in accordance with some embodiments. Various regions of a GRIN LC lens are illustrated, proceeding from a center region and outward through edge regions Edge1-Edge4. As shown in the diagram of FIG. 15, the pupil of eye 1502 may be spaced at a distance of approximately 2 cm from the GRIN LC lens when a device including the GRIN LC lens 1504 is worn by the user. From the position of the illustrated pupil of eye 1502, the center and Edge1-Edge4 radial locations on the GRIN LC lens, which are located at the 5 mm aperture stops, are respectively centered at radial angles of approximately 14°, 27°, 37°, and 45° from the lens 1504 center.

FOV zones and center of viewing angles for aperture stop regions (i.e., center aperture and subaperture1-subaperture4) of an example GRIN LC lens with reset densities within 5 mm aperture stop increases located radially on a GRIN LC lens are shown in Table 3.

TABLE 3

FOV and Center of Viewing Angle for Lens Aperture Stops

| Aperture Stop | FOV | Center of Viewing Angle (θ) |
|---|---|---|
| Center | −7° to +7° | 0° |
| Subaperture1 | +/−7° to +/−20° | 14° |
| Subaperture2 | +/−20° to +/−35° | 27° |
| Subaperture3 | +/−35° to +/−42° | 39° |
| Subaperture4 | +/−42° to +/−49° | 46° |

The Fresnel reset density within the indicated 5 mm aperture stops increases radially. Utilizing optical power reduction in a GRIN LC lens proceeding radially outward, as described herein (see, e.g., FIG. 13), may likewise result in lower densities of phase resets proceeding radially outward.

Figure 16:
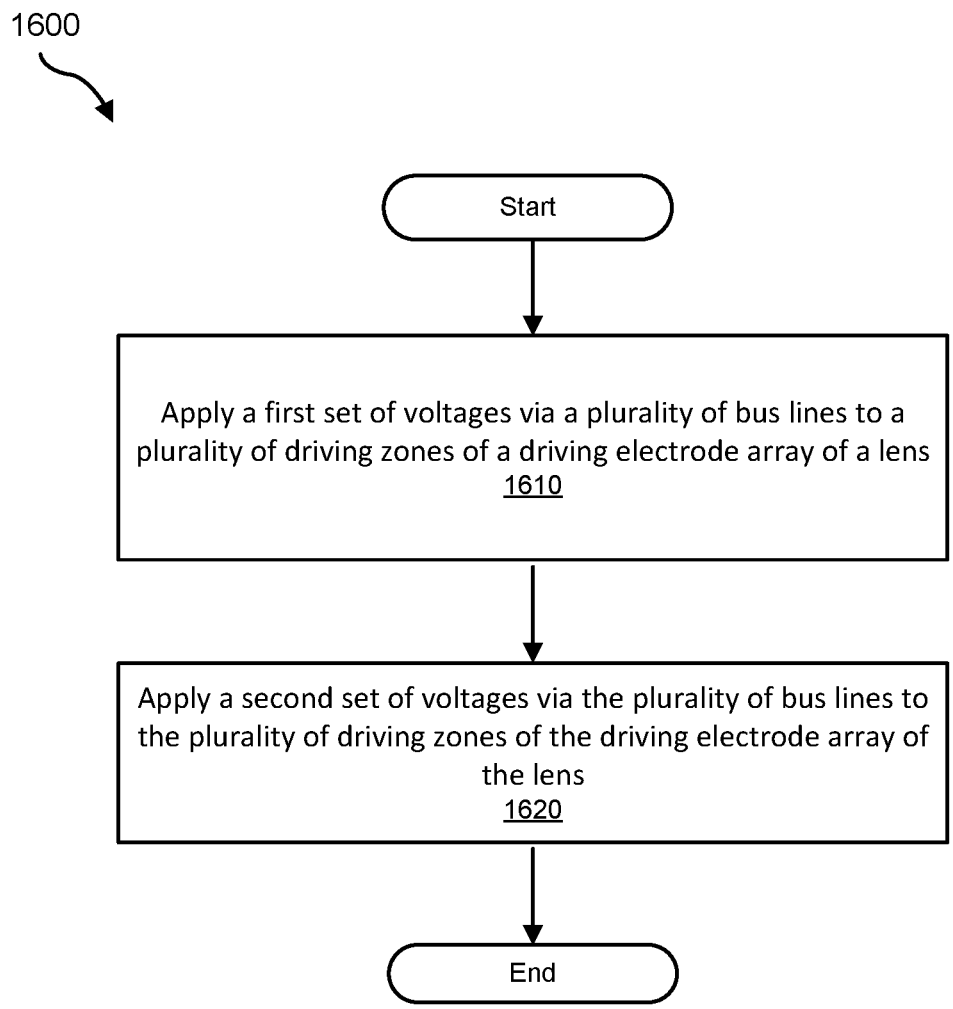
FIG. 16 is a flow diagram of an exemplary method for operating a GRIN LC lens according to some embodiments.

FIG. 16 is a flow diagram of an exemplary method 1600 for operating a GRIN LC lens in accordance with embodiments of this disclosure. As illustrated in FIG. 16, at step 1610, a first set of voltages may be applied via a plurality of bus lines to a plurality of driving zones of a driving electrode array of a lens. In some examples, the plurality of driving zones of the driving electrode array may be concentrically arranged proceeding from a center to a radially outer periphery of the lens. The lens may include a liquid crystal layer disposed between the driving electrode array and a second electrode layer. Additionally, the plurality of driving zones may each be configured to produce a different optical power in a corresponding lens segment of a plurality of lens segments of the lens when the first set of voltages are applied by the first electrode layer to the liquid crystal layer.

At step 1620 in FIG. 16, a second set of voltages may be applied via the plurality of bus lines to the plurality of driving zones of the driving electrode array of the lens. In some examples, the plurality of driving zones may each be configured to produce a different optical power in the corresponding lens segment of the plurality of lens segments of the lens when the second set of voltages are applied by the first electrode layer to the liquid crystal layer. The optical powers produced in the plurality of lens segments in response to the first set of voltages may be different than the optical powers produced in response to the second set of voltages.

As described herein, the disclosed display devices and systems may include GRIN LC lenses having electrode arrays that are partitioned into multiple driving zones covering different portions of the lenses. The disclosed GRIN LC lenses may include a reduced number of phase resets, with phase resets exhibiting gradually, iteratively reduced optical power in comparison to a conventional ideal lens phase profile. The reduction in the number of phase resets may result in reduced scattering and angles of diffraction, thereby providing improved optical quality. In some examples, optical power of a GRIN LC lens may be dependent on the number of phase resets, the birefringence of the liquid crystal (LC) material, and the LC cell thickness. Assuming the LC material and cell thickness are unchanged, reducing the number of phase resets may reduce the total optical power. Taking into account human visual acuity with gazing angle, if the optical power of a GRIN LC lens is gradually decreased proceeding between lens segments from the center towards the outer edge of the lens, the required number of phase resets may go down. The human eye may be able to accommodate a resulting reduction in optical power of a lens towards the edge of the lens. At any tunable optical power state, such a gradual change of optical power of a GRIN LC lens may result in better MTF than a GRIN LC lens that has more phase resets that maintain a fixed optical power over the visible area of a clear aperture. Gradual change of the optical power of a GRIN LC lens may also help reduce dynamic distortion.

EXAMPLE EMBODIMENTS

Example 1: A lens includes a first electrode electrode layer, a second electrode layer, and a liquid crystal layer disposed between the first electrode layer and the second electrode layer. The lens is divided into a plurality of lens segments that are concentrically arranged proceeding from a center to a radially outer periphery of the lens. An optical power of a first lens segment of the plurality of lens segments is greater than an optical power of a second lens segment of the plurality of lens segments disposed radially outward relative to the first lens segment.

Example 2: The lens of Example 1, further including a third lens segment of the plurality of lens segments that is disposed radially outward relative to the second lens segment. The optical power of the third lens segment is less than the optical power of the second lens segment.

Example 3: The lens of any of Examples 1 and 2, further including a plurality of bus lines coupled to the first electrode layer and a controller that applies a different voltage to each of the plurality of bus lines.

Example 4: The lens of any of Examples 1-3, where the first electrode layer includes a driving electrode array divided into a plurality of driving zones and each driving zone of the plurality of driving zones is positioned in a separate lens segment of the plurality of lens segments.

Example 5: The lens of Example 4, where each driving zone of the plurality of driving zones includes a plurality of driving electrodes consecutively arranged along a radial direction extending outward from the center and adjacent driving electrodes in a driving zone of the plurality of driving zones are coupled to each other by a resistor.

Example 6: The lens of Examples 5, where a plurality of bus lines is coupled to the driving electrode array and each bus line of the plurality of bus lines is electrically coupled to each driving zone of the plurality of driving zones.

Example 7: The lens of Examples 6, where each bus line of the plurality of bus lines is electrically coupled to a different driving electrode of the plurality of driving electrodes in each driving zone of the plurality of driving zones.

Example 8: The lens of any of Examples 5-7, where a resistor coupling two adjacent driving electrodes is configured to maintain a voltage difference between the two adjacent driving electrodes during operation.

Example 9: The lens of any of Examples 5-8, where the plurality of driving electrodes in a driving zone each overlap an area having approximately the same size.

Example 10: The lens of any of Examples 4-9, where each driving zone is electrically separated from other driving zones of the plurality of driving zones.

Example 11: The lens of any of Examples 4-10, where adjacent driving electrodes are separated from each other by a gap region extending between the adjacent driving electrodes.

Example 12: The lens of any of Examples 1-11, where each of the plurality of driving zones extends along an arcuate path.

Example 13: A lens includes a first electrode electrode layer including a driving electrode array divided into a plurality of driving zones, a second electrode layer, and a liquid crystal layer disposed between the first electrode layer and the second electrode layer. The plurality of driving zones of the driving electrode array are concentrically arranged proceeding from a center to a radially outer periphery of the lens. The plurality of driving zones are each configured to produce a different optical power in a corresponding lens segment of a plurality of lens segments of the lens when voltages are applied by the first electrode layer to the liquid crystal layer.

Example 14: The lens of Example 13, where each driving zone of the plurality of driving zones includes a plurality of driving electrodes consecutively arranged along a radial direction extending outward from the center and a plurality of bus lines is coupled to the driving electrode array.

Example 15: The lens of Example 14, where each bus line of the plurality of bus lines is electrically coupled to each driving zone of the plurality of driving zones.

Example 16: The lens of any of Examples 14 and 15, where each bus line of the plurality of bus lines is electrically coupled to a different driving electrode of the plurality of driving electrodes in each driving zone of the plurality of driving zones.

Example 17: The lens of any of Examples 14-16, where adjacent driving electrodes in a driving zone of the plurality of driving zones are coupled to each other by a resistor and a resistor coupling two adjacent driving electrodes is configured to maintain a voltage difference between the two adjacent driving electrodes during operation.

Example 18: The lens of any of Examples 13-17, where each of the plurality of driving zones extends along an arcuate path.

Example 19: A method includes applying a first set of voltages via a plurality of bus lines to a plurality of driving zones of a driving electrode array of a lens, where i) the plurality of driving zones of the driving electrode array are concentrically arranged proceeding from a center to a radially outer periphery of the lens, ii) the lens includes a liquid crystal layer disposed between the driving electrode array and a second electrode layer, and iii) the plurality of driving zones are each configured to produce a different optical power in a corresponding lens segment of a plurality of lens segments of the lens when the first set of voltages are applied by the first electrode layer to the liquid crystal layer. The method further includes applying a second set of voltages via the plurality of bus lines to the plurality of driving zones of the driving electrode array of the lens.

Example 20: The method of Example 19, where i) the plurality of driving zones are each configured to produce a different optical power in the corresponding lens segment of the plurality of lens segments of the lens when the second set of voltages are applied by the first electrode layer to the liquid crystal layer, and ii) the optical powers produced in the plurality of lens segments in response to the first set of voltages is different than the optical powers produced in response to the second set of voltages.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1700 in FIG. 17) or that visually immerses a user in an artificial reality (such as, e.g., virtual-reality system 1800 in FIG. 18). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 17:
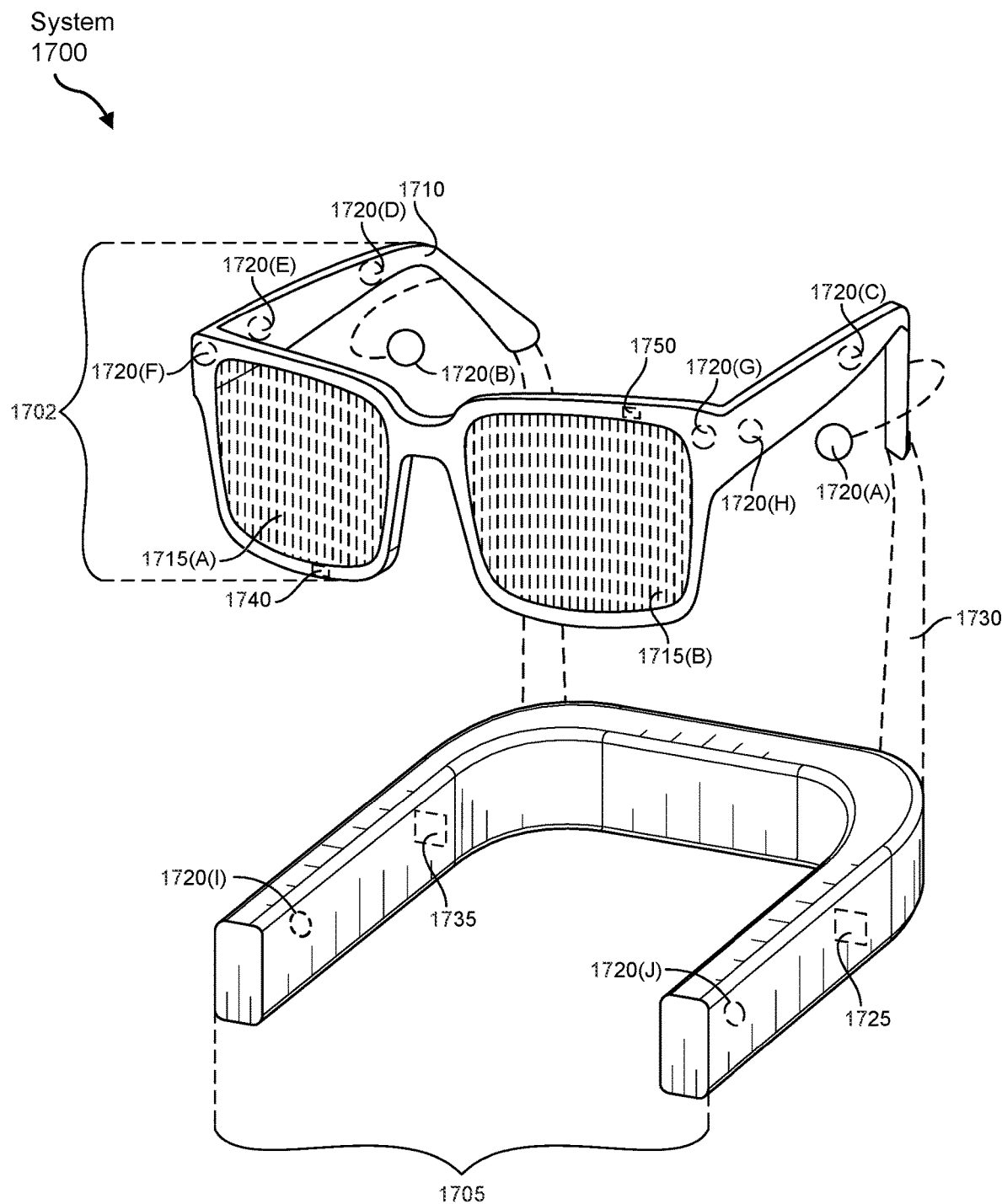
FIG. 17 is an illustration of an example augmented-reality glasses that may be used in connection with embodiments of this disclosure.
Figure 18:
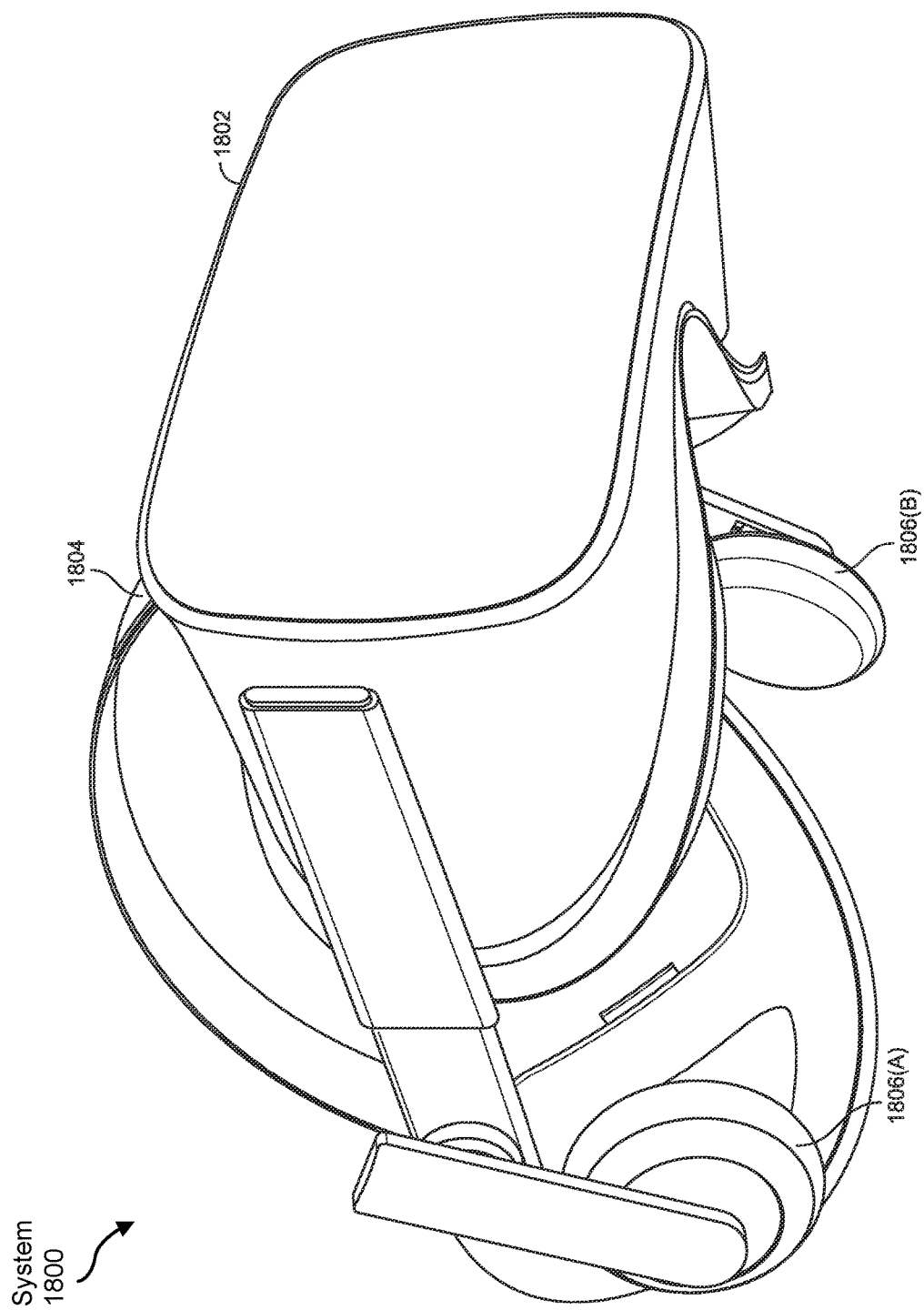
FIG. 18 is an illustration of an example virtual-reality headset that may be used in connection with embodiments of this disclosure.

Turning to FIG. 17, augmented-reality system 1700 may include an eyewear device 1702 with a frame 1710 configured to hold a left display device 1715(A) and a right display device 1715(B) in front of a user's eyes. Display devices 1715(A) and 1715(B) may act together or independently to present an image or series of images to a user. While augmented-reality system 1700 includes two displays, embodiments of this disclosure may be implemented in augmented-reality systems with a single NED or more than two NEDs.

In some embodiments, augmented-reality system 1700 may include one or more sensors, such as sensor 1740. Sensor 1740 may generate measurement signals in response to motion of augmented-reality system 1700 and may be located on substantially any portion of frame 1710. Sensor 1740 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1700 may or may not include sensor 1740 or may include more than one sensor. In embodiments in which sensor 1740 includes an IMU, the IMU may generate calibration data based on measurement signals from sensor 1740. Examples of sensor 1740 may include, without limitation, accelerometers, gyroscopes, magnetometers, other suitable types of sensors that detect motion, sensors used for error correction of the IMU, or some combination thereof.

In some examples, augmented-reality system 1700 may also include a microphone array with a plurality of acoustic transducers 1720(A)-1720(J), referred to collectively as acoustic transducers 1720. Acoustic transducers 1720 may represent transducers that detect air pressure variations induced by sound waves. Each acoustic transducer 1720 may be configured to detect sound and convert the detected sound into an electronic format (e.g., an analog or digital format). The microphone array in FIG. 17 may include, for example, ten acoustic transducers: 1720(A) and 1720(B), which may be designed to be placed inside a corresponding ear of the user, acoustic transducers 1720(C), 1720(D), 1720(E), 1720(F), 1720(G), and 1720(H), which may be positioned at various locations on frame 1710, and/or acoustic transducers 1720(I) and 1720(J), which may be positioned on a corresponding neckband 1705.

In some embodiments, one or more of acoustic transducers 1720(A)-(J) may be used as output transducers (e.g., speakers). For example, acoustic transducers 1720(A) and/or 1720(B) may be earbuds or any other suitable type of headphone or speaker.

The configuration of acoustic transducers 1720 of the microphone array may vary. While augmented-reality system 1700 is shown in FIG. 17 as having ten acoustic transducers 1720, the number of acoustic transducers 1720 may be greater or less than ten. In some embodiments, using higher numbers of acoustic transducers 1720 may increase the amount of audio information collected and/or the sensitivity and accuracy of the audio information. In contrast, using a lower number of acoustic transducers 1720 may decrease the computing power required by an associated controller 1750 to process the collected audio information. In addition, the position of each acoustic transducer 1720 of the microphone array may vary. For example, the position of an acoustic transducer 1720 may include a defined position on the user, a defined coordinate on frame 1710, an orientation associated with each acoustic transducer 1720, or some combination thereof.

Acoustic transducers 1720(A) and 1720(B) may be positioned on different parts of the user's ear, such as behind the pinna, behind the tragus, and/or within the auricle or fossa. Or, there may be additional acoustic transducers 1720 on or surrounding the ear in addition to acoustic transducers 1720 inside the ear canal. Having an acoustic transducer 1720 positioned next to an ear canal of a user may enable the microphone array to collect information on how sounds arrive at the ear canal. By positioning at least two of acoustic transducers 1720 on either side of a user's head (e.g., as binaural microphones), augmented-reality device 1700 may simulate binaural hearing and capture a 3D stereo sound field around about a user's head. In some embodiments, acoustic transducers 1720(A) and 1720(B) may be connected to augmented-reality system 1700 via a wired connection 1730, and in other embodiments acoustic transducers 1720(A) and 1720(B) may be connected to augmented-reality system 1700 via a wireless connection (e.g., a BLUETOOTH connection). In still other embodiments, acoustic transducers 1720(A) and 1720(B) may not be used at all in conjunction with augmented-reality system 1700.

Acoustic transducers 1720 on frame 1710 may be positioned in a variety of different ways, including along the length of the temples, across the bridge, above or below display devices 1715(A) and 1715(B), or some combination thereof. Acoustic transducers 1720 may also be oriented such that the microphone array is able to detect sounds in a wide range of directions surrounding the user wearing the augmented-reality system 1700. In some embodiments, an optimization process may be performed during manufacturing of augmented-reality system 1700 to determine relative positioning of each acoustic transducer 1720 in the microphone array.

In some examples, augmented-reality system 1700 may include or be connected to an external device (e.g., a paired device), such as neckband 1705. Neckband 1705 generally represents any type or form of paired device. Thus, the following discussion of neckband 1705 may also apply to various other paired devices, such as charging cases, smart watches, smart phones, wrist bands, other wearable devices, hand-held controllers, tablet computers, laptop computers, other external compute devices, etc.

As shown, neckband 1705 may be coupled to eyewear device 1702 via one or more connectors. The connectors may be wired or wireless and may include electrical and/or non-electrical (e.g., structural) components. In some cases, eyewear device 1702 and neckband 1705 may operate independently without any wired or wireless connection between them. While FIG. 17 illustrates the components of eyewear device 1702 and neckband 1705 in example locations on eyewear device 1702 and neckband 1705, the components may be located elsewhere and/or distributed differently on eyewear device 1702 and/or neckband 1705. In some embodiments, the components of eyewear device 1702 and neckband 1705 may be located on one or more additional peripheral devices paired with eyewear device 1702, neckband 1705, or some combination thereof.

Pairing external devices, such as neckband 1705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1700 may be provided by a paired device or shared between a paired device and an eyewear device, thus reducing the weight, heat profile, and form factor of the eyewear device overall while still retaining desired functionality. For example, neckband 1705 may allow components that would otherwise be included on an eyewear device to be included in neckband 1705 since users may tolerate a heavier weight load on their shoulders than they would tolerate on their heads. Neckband 1705 may also have a larger surface area over which to diffuse and disperse heat to the ambient environment. Thus, neckband 1705 may allow for greater battery and computation capacity than might otherwise have been possible on a stand-alone eyewear device. Since weight carried in neckband 1705 may be less invasive to a user than weight carried in eyewear device 1702, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1705 may be communicatively coupled with eyewear device 1702 and/or to other devices. These other devices may provide certain functions (e.g., tracking, localizing, depth mapping, processing, storage, etc.) to augmented-reality system 1700. In the embodiment of FIG. 17, neckband 1705 may include two acoustic transducers (e.g., 1720(I) and 1720(J)) that are part of the microphone array (or potentially form their own microphone subarray). Neckband 1705 may also include a controller 1725 and a power source 1735.

Acoustic transducers 1720(I) and 1720(J) of neckband 1705 may be configured to detect sound and convert the detected sound into an electronic format (analog or digital). In the embodiment of FIG. 17, acoustic transducers 1720(I) and 1720(J) may be positioned on neckband 1705, thereby increasing the distance between the neckband acoustic transducers 1720(I) and 1720(J) and other acoustic transducers 1720 positioned on eyewear device 1702. In some cases, increasing the distance between acoustic transducers 1720 of the microphone array may improve the accuracy of beamforming performed via the microphone array. For example, if a sound is detected by acoustic transducers 1720(C) and 1720(D) and the distance between acoustic transducers 1720(C) and 1720(D) is greater than, e.g., the distance between acoustic transducers 1720(D) and 1720(E), the determined source location of the detected sound may be more accurate than if the sound had been detected by acoustic transducers 1720(D) and 1720(E).

Controller 1725 of neckband 1705 may process information generated by the sensors on neckband 1705 and/or augmented-reality system 1700. For example, controller 1725 may process information from the microphone array that describes sounds detected by the microphone array. For each detected sound, controller 1725 may perform a direction-of-arrival (DOA) estimation to estimate a direction from which the detected sound arrived at the microphone array. As the microphone array detects sounds, controller 1725 may populate an audio data set with the information. In embodiments in which augmented-reality system 1700 includes an inertial measurement unit, controller 1725 may compute all inertial and spatial calculations from the IMU located on eyewear device 1702. A connector may convey information between augmented-reality system 1700 and neckband 1705 and between augmented-reality system 1700 and controller 1725. The information may be in the form of optical data, electrical data, wireless data, or any other transmittable data form. Moving the processing of information generated by augmented-reality system 1700 to neckband 1705 may reduce weight and heat in eyewear device 1702, making it more comfortable to the user.

Power source 1735 in neckband 1705 may provide power to eyewear device 1702 and/or to neckband 1705. Power source 1735 may include, without limitation, lithium ion batteries, lithium-polymer batteries, primary lithium batteries, alkaline batteries, or any other form of power storage. In some cases, power source 1735 may be a wired power source. Including power source 1735 on neckband 1705 instead of on eyewear device 1702 may help better distribute the weight and heat generated by power source 1735.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1800 in FIG. 18, that mostly or completely covers a user's field of view. Virtual-reality system 1800 may include a front rigid body 1802 and a band 1804 shaped to fit around a user's head. Virtual-reality system 1800 may also include output audio transducers 1806(A) and 1806(B). Furthermore, while not shown in FIG. 18, front rigid body 1802 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1700 and/or virtual-reality system 1800 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1700 and/or virtual-reality system 1800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1700 and/or virtual-reality system 1800 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A lens comprising;
a first electrode electrode layer;
a second electrode layer; and
a liquid crystal layer disposed between the first electrode layer and the second electrode layer;
wherein:
the lens is divided into a plurality of lens segments that are concentrically arranged proceeding from a center to a radially outer periphery of the lens; and
an optical power of a first lens segment of the plurality of lens segments is greater than an optical power of a second lens segment of the plurality of lens segments disposed radially outward relative to the first lens segment.

2. The lens system of claim 1, further comprising a third lens segment of the plurality of lens segments that is disposed radially outward relative to the second lens segment, wherein the optical power of the third lens segment is less than the optical power of the second lens segment.

3. The lens system of claim 1, further comprising:
a plurality of bus lines coupled to the first electrode layer; and
a controller that applies a different voltage to each of the plurality of bus lines.

4. The lens system of claim 1, wherein:
the first electrode layer comprises a driving electrode array divided into a plurality of driving zones; and
each driving zone of the plurality of driving zones is positioned in a separate lens segment of the plurality of lens segments.

5. The lens system of claim 4, wherein:
each driving zone of the plurality of driving zones comprises a plurality of driving electrodes consecutively arranged along a radial direction extending outward from the center; and
adjacent driving electrodes in a driving zone of the plurality of driving zones are coupled to each other by a resistor.

6. The lens system of claim 5, wherein:
a plurality of bus lines is coupled to the driving electrode array; and
each bus line of the plurality of bus lines is electrically coupled to each driving zone of the plurality of driving zones.

7. The lens system of claim 6, wherein each bus line of the plurality of bus lines is electrically coupled to a different driving electrode of the plurality of driving electrodes in each driving zone of the plurality of driving zones.

8. The lens system of claim 5, wherein a resistor coupling two adjacent driving electrodes is configured to maintain a voltage difference between the two adjacent driving electrodes during operation.

9. The lens system of claim 5, wherein the plurality of driving electrodes in a driving zone each overlap an area having approximately the same size.

10. The lens system of claim 4, wherein each driving zone is electrically separated from other driving zones of the plurality of driving zones.

11. The lens system of claim 4, wherein adjacent driving electrodes are separated from each other by a gap region extending between the adjacent driving electrodes.

12. The lens system of claim 1, wherein each of the plurality of lens segments extends along an arcuate path.

13. A lens comprising;
a first electrode electrode layer comprising a driving electrode array divided into a plurality of driving zones;
a second electrode layer; and
a liquid crystal layer disposed between the first electrode layer and the second electrode layer;
wherein:
   the plurality of driving zones of the driving electrode array are concentrically arranged proceeding from a center to a radially outer periphery of the lens; and
   the plurality of driving zones are each configured to produce a different optical power in a corresponding lens segment of a plurality of lens segments of the lens when voltages are applied by the first electrode layer to the liquid crystal layer.

14. The lens system of claim 13, wherein:
each driving zone of the plurality of driving zones comprises a plurality of driving electrodes consecutively arranged along a radial direction extending outward from the center; and
a plurality of bus lines is coupled to the driving electrode array.

15. The lens system of claim 14, wherein each bus line of the plurality of bus lines is electrically coupled to each driving zone of the plurality of driving zones.

16. The lens system of claim 14, wherein each bus line of the plurality of bus lines is electrically coupled to a different driving electrode of the plurality of driving electrodes in each driving zone of the plurality of driving zones.

17. The lens system of claim 14, wherein:
adjacent driving electrodes in a driving zone of the plurality of driving zones are coupled to each other by a resistor; and
a resistor coupling two adjacent driving electrodes is configured to maintain a voltage difference between the two adjacent driving electrodes during operation.

18. The lens system of claim 13, wherein each of the plurality of driving zones extends along an arcuate path.

19. A method comprising:
applying a first set of voltages via a plurality of bus lines to a plurality of driving zones of a driving electrode array of a lens, wherein:
   the plurality of driving zones of the driving electrode array are concentrically arranged proceeding from a center to a radially outer periphery of the lens;
   the lens comprises a liquid crystal layer disposed between the driving electrode array and a second electrode layer; and
   the plurality of driving zones are each configured to produce a different optical power in a corresponding lens segment of a plurality of lens segments of the lens when the first set of voltages are applied by the first electrode layer to the liquid crystal layer; and
applying a second set of voltages via the plurality of bus lines to the plurality of driving zones of the driving electrode array of the lens.

20. The method of claim 19, wherein:
the plurality of driving zones are each configured to produce a different optical power in the corresponding lens segment of the plurality of lens segments of the lens when the second set of voltages are applied by the first electrode layer to the liquid crystal layer; and
the optical powers produced in the plurality of lens segments in response to the first set of voltages is different than the optical powers produced in response to the second set of voltages.

* * * * *